(12) United States Patent
Smith et al.

(10) Patent No.: US 11,339,657 B2
(45) Date of Patent: May 24, 2022

(54) CUTTER HEAD FOR MINING MACHINE

(71) Applicant: Joy Global Underground Mining LLC, Warrendale, PA (US)

(72) Inventors: Russell P. Smith, New South Wales (AU); Andrew D. Hunter, New South Wales (AU); Peter A. Lugg, Queensland (AU); Ian B. Schirmer, Queenland (AU); Geoffrey W. Keech, Queensland (AU); Christopher Coates, Queensland (AU); Bradley M. Neilson, New South Wales (AU)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 16/678,656

(22) Filed: Nov. 8, 2019

(65) Prior Publication Data

US 2020/0072050 A1    Mar. 5, 2020

Related U.S. Application Data

(63) Continuation of application No. 15/266,386, filed on Sep. 15, 2016, now Pat. No. 10,471,961, which is a
(Continued)

(51) Int. Cl.
*E21C 35/24* (2006.01)
*E21C 35/00* (2006.01)
(Continued)

(52) U.S. Cl.
CPC .............. *E21C 35/24* (2013.01); *E21C 35/00* (2013.01); *E21C 25/06* (2013.01); *E21C 25/16* (2013.01);
(Continued)

(58) Field of Classification Search
CPC ....................................................... E21C 35/24
See application file for complete search history.

(56) References Cited

U.S. PATENT DOCUMENTS

| 1,093,787 A | 4/1914 | Kuhn et al. |
| 1,735,583 A | 11/1929 | Morgan |
| (Continued) | | |

FOREIGN PATENT DOCUMENTS

| AU | 466244 B1 | 2/1972 |
| CA | 2141984 A1 | 8/1996 |
| (Continued) | | |

OTHER PUBLICATIONS

Examination Report No. 2 issued by the Australian Government for Application No. 2018203820 dated Aug. 5, 2020 (3 pages).
(Continued)

*Primary Examiner* — Janine M Kreck
(74) *Attorney, Agent, or Firm* — Michael Best & Friedrich LLP

(57) ABSTRACT

A cutter head includes a first member, a cutting bit, and a second member. The first member includes a first end and a second end and includes a first mass. The cutting bit is coupled to the first member proximate the second end. The cutting bit includes a cutting edge rotatable about the axis. The second member is rotatable about the axis and includes a second mass eccentrically positioned with respect to the axis. Rotation of the second mass causes the first member and the cutting bit to oscillate.

30 Claims, 15 Drawing Sheets

Related U.S. Application Data continuation of application No. 14/028,511, filed on Sep. 16, 2013, now Pat. No. 9,470,087.

(60) Provisional application No. 61/701,256, filed on Sep. 14, 2012.

(51) Int. Cl.
| | |
|---|---|
| E21C 25/06 | (2006.01) |
| E21C 41/16 | (2006.01) |
| E21C 25/16 | (2006.01) |
| E21C 27/16 | (2006.01) |
| E21C 31/02 | (2006.01) |
| E21D 9/10 | (2006.01) |

(52) U.S. Cl.
CPC .............. *E21C 27/16* (2013.01); *E21C 31/02* (2013.01); *E21C 41/16* (2013.01); *E21D 9/102* (2013.01)

(56) References Cited

U.S. PATENT DOCUMENTS

| | | |
|---|---|---|
| 1,953,326 A | 4/1934 | Morgan |
| 2,336,335 A | 12/1943 | Zublin |
| 2,336,337 A | 12/1943 | Zublin |
| 2,517,267 A | 8/1950 | Watson |
| 2,619,338 A | 11/1952 | Lindgren |
| 2,619,339 A | 11/1952 | Cartlidge |
| 2,654,586 A | 10/1953 | Berry |
| 2,659,585 A | 11/1953 | McCallum |
| 2,745,651 A | 5/1956 | Herrmann |
| 2,756,039 A | 7/1956 | Barrett |
| 2,776,823 A | 1/1957 | Barrett |
| 3,157,437 A | 11/1964 | Gonski |
| 3,197,256 A | 7/1965 | Hlinsky |
| 3,302,974 A | 2/1967 | Hlinsky |
| 3,306,663 A | 2/1967 | Webster |
| 3,353,871 A | 11/1967 | Arentzen |
| 3,355,215 A | 11/1967 | Haspert et al. |
| 3,408,109 A | 10/1968 | Lockwood |
| 3,412,816 A | 11/1968 | Lautsch |
| 3,446,535 A | 5/1969 | Lauber |
| 3,647,263 A | 3/1972 | Lauber et al. |
| 3,663,054 A | 5/1972 | Dubois |
| 3,729,056 A | 4/1973 | Paurat |
| 3,719,404 A | 6/1973 | Sterner |
| 3,840,271 A | 10/1974 | Sugden |
| 3,922,017 A | 11/1975 | Cobb |
| 3,929,378 A | 12/1975 | Frenyo et al. |
| 3,972,571 A | 8/1976 | Benkowski |
| 3,995,907 A | 12/1976 | Dubois |
| 4,005,905 A | 2/1977 | Dubois |
| 4,087,131 A | 5/1978 | Peterson et al. |
| 4,096,917 A | 6/1978 | Harris |
| 4,108,494 A | 8/1978 | Kogler |
| 4,230,372 A | 10/1980 | Marten |
| 4,248,481 A | 2/1981 | Stoltefuss |
| 4,273,383 A | 6/1981 | Grisebach |
| 4,302,054 A | 11/1981 | Haskew et al. |
| 4,372,403 A | 2/1983 | Beeman |
| 4,377,311 A | 3/1983 | Seller |
| 4,470,635 A | 9/1984 | Paurat et al. |
| 4,516,807 A | 5/1985 | Eagles |
| 4,548,442 A | 10/1985 | Sugden et al. |
| 4,589,701 A | 5/1986 | Beckmann et al. |
| 4,643,483 A | 2/1987 | Brooks et al. |
| 4,647,112 A | 3/1987 | Demoulin et al. |
| 4,662,684 A | 5/1987 | Marten |
| 4,682,819 A | 7/1987 | Masse |
| 4,741,577 A * | 5/1988 | Sato ........................ E21C 35/24 173/11 |
| 4,755,002 A | 7/1988 | Parrott |
| 4,760,513 A | 7/1988 | Edwards |
| 4,796,713 A | 1/1989 | Bechem |
| 4,838,614 A | 6/1989 | Pentith et al. |
| 4,838,615 A | 6/1989 | Oldham |
| 4,848,486 A | 7/1989 | Bodine |
| 4,878,714 A | 11/1989 | Barnthaler et al. |
| 4,968,098 A * | 11/1990 | Hirsch ..................... E21C 35/10 299/1.1 |
| 5,028,092 A | 7/1991 | Coski |
| 5,050,934 A | 9/1991 | Brandl et al. |
| 5,087,102 A | 2/1992 | Kiefer |
| 5,112,111 A | 5/1992 | Addington et al. |
| 5,190,353 A | 3/1993 | Bechem |
| 5,205,612 A | 4/1993 | Sugden et al. |
| 5,210,997 A | 5/1993 | Mountcastle, Jr. |
| 5,234,257 A | 8/1993 | Sugden et al. |
| 5,601,153 A | 2/1997 | Ensminger et al. |
| 5,676,125 A | 10/1997 | Kelly et al. |
| 5,697,733 A | 12/1997 | Marsh |
| 5,938,288 A * | 8/1999 | Saint-Pierre ............ E21C 35/24 299/1.4 |
| 6,086,257 A | 7/2000 | Lee |
| 6,561,590 B2 | 5/2003 | Sugden |
| 6,857,706 B2 | 2/2005 | Hames et al. |
| 6,938,702 B2 | 9/2005 | Saha et al. |
| 7,182,407 B1 | 2/2007 | Peach et al. |
| 7,325,882 B2 | 2/2008 | Sugden et al. |
| 7,384,104 B2 | 6/2008 | Sugden |
| 7,431,402 B2 | 10/2008 | Peach et al. |
| 7,490,911 B2 | 2/2009 | Steinberg et al. |
| 7,695,071 B2 | 4/2010 | Jackson et al. |
| 7,731,298 B2 | 6/2010 | Merten et al. |
| 7,934,776 B2 * | 5/2011 | de Andrade ............ E21C 27/02 299/75 |
| 7,954,735 B2 | 6/2011 | Belotserkovsky |
| 8,079,647 B2 | 12/2011 | Yao et al. |
| 8,276,991 B2 | 10/2012 | Thomson |
| 8,328,292 B2 | 12/2012 | de Andrade et al. |
| 8,636,324 B2 | 1/2014 | Skea |
| 8,690,262 B2 | 4/2014 | Ebner et al. |
| 8,727,450 B2 | 5/2014 | de Andrade et al. |
| 9,470,087 B2 | 10/2016 | Smith et al. |
| 2002/0093239 A1 | 7/2002 | Sugden |
| 2005/0200192 A1 | 9/2005 | Sugden et al. |
| 2007/0090678 A1 | 4/2007 | Peach et al. |
| 2007/0193810 A1 | 8/2007 | Steinberg et al. |
| 2008/0156531 A1 | 7/2008 | Boone et al. |
| 2009/0058172 A1 | 3/2009 | DeAndrade et al. |
| 2009/0066148 A1 | 3/2009 | Willison |
| 2009/0127918 A1 | 5/2009 | Yao et al. |
| 2010/0019563 A1 | 1/2010 | Thomson |
| 2010/0260563 A1 | 10/2010 | Conroy et al. |
| 2011/0062768 A1 | 3/2011 | Van Zyl et al. |
| 2011/0181097 A1 | 7/2011 | Skea |
| 2012/0098325 A1 | 4/2012 | Junker et al. |
| 2013/0057044 A1 | 3/2013 | De Andrade et al. |
| 2014/0077578 A1 | 3/2014 | Smith et al. |
| 2014/0091612 A1 | 4/2014 | Rowher et al. |
| 2014/0178155 A1 | 6/2014 | Feasey |
| 2015/0152728 A1 | 6/2015 | Hartwig et al. |
| 2017/0204666 A1 | 7/2017 | Galler et al. |
| 2017/0211383 A1 | 7/2017 | Lugg et al. |
| 2017/0342829 A1 | 11/2017 | De Sousa et al. |
| 2018/0051561 A1 | 2/2018 | Daher et al. |
| 2018/0051562 A1 | 2/2018 | Daher et al. |
| 2018/0087379 A1 | 3/2018 | Lugg et al. |

FOREIGN PATENT DOCUMENTS

| | | |
|---|---|---|
| CL | 35975 | 2/1988 |
| CL | 199600179 | 9/1996 |
| CL | 199900483 | 3/1999 |
| CL | 200901978 | 2/2010 |
| CN | 101778998 A | 7/2010 |
| CN | 101828004 A | 9/2010 |
| CN | 102061914 A | 5/2011 |
| CN | 102305067 A | 1/2012 |
| CN | 102513998 A | 6/2012 |
| CN | 102587911 A | 7/2012 |
| CN | 102606154 A | 7/2012 |
| CN | 102704927 B | 10/2012 |

(56) References Cited

FOREIGN PATENT DOCUMENTS

| | | | |
|---|---|---|---|
| CN | 102733803 | A | 10/2012 |
| CN | 202500560 | U | 10/2012 |
| CN | 202991028 | U | 6/2013 |
| CN | 103206213 | A | 7/2013 |
| CN | 103498671 | A | 1/2014 |
| CN | 104047603 | A | 9/2014 |
| CN | 104500086 | A | 4/2015 |
| CN | 204283458 | U | 4/2015 |
| DE | 4123307 | C1 | 12/1992 |
| DE | 4440261 | A1 | 5/1996 |
| DE | 19900906 | A1 | 7/2000 |
| EP | 0176234 | A1 | 4/1986 |
| EP | 0329915 | A1 | 8/1989 |
| GB | 2214963 | A | 9/1989 |
| JP | S5540058 | U | 3/1980 |
| JP | H02147793 | A | 6/1990 |
| RU | 1779278 | C | 11/1992 |
| RU | 2044125 | C1 | 9/1995 |
| RU | 2142561 | C1 | 12/1999 |
| RU | 2187640 | C1 | 8/2002 |
| RU | 2209979 | C2 | 8/2003 |
| RU | 2276728 | C1 | 5/2006 |
| RU | 2441155 | C1 | 1/2012 |
| SU | 323552 | A | 11/1972 |
| SU | 514097 | A1 | 5/1976 |
| SU | 581263 | A1 | 11/1977 |
| SU | 619117 | A3 | 8/1978 |
| SU | 750061 | A1 | 7/1980 |
| SU | 804832 | A1 | 2/1981 |
| SU | 962626 | A1 | 9/1982 |
| SU | 1328521 | A1 | 8/1987 |
| SU | 1712599 | A1 | 2/1992 |
| SU | 1731946 | A1 | 5/1992 |
| SU | 1744249 | A1 | 6/1992 |
| WO | 0043637 | A1 | 7/2000 |
| WO | 0046486 | A1 | 8/2000 |
| WO | 0201045 | A1 | 1/2002 |
| WO | 02066793 | A1 | 8/2002 |
| WO | 2003062587 | A1 | 7/2003 |
| WO | 03089761 | A1 | 10/2003 |
| WO | 2012156843 | A2 | 9/2005 |
| WO | 2006075910 | A1 | 7/2006 |
| WO | 2016055087 | A1 | 4/2016 |

OTHER PUBLICATIONS

Chilean Patent Office Search Report and Examiner's Report for Application No. 201901190 dated Mar. 11, 2020 (18 pages including statement of relevance).
International Search Report and Written Opinion for Application No. PCT/US2013/060017 dated Apr. 15, 2014 (18 pages).
Second Office Action with English translation from the State Intellectual Property Office of the People's Republic of China for Application No. 201380053676.0 dated Nov. 2, 2016 (20 pages).
Supplementary European Search Report from the European Patent Office for Application No. 13837734.6 dated Jul. 26, 2016 (1 page).
Chilean Office Action for Application No. 2015-000627 dated Oct. 7, 2017 (17 pages including Statement of Relevance).
Second Australian Examination Report for Application No. 2013315063 dated Nov. 9, 2017 (3 pages).
Fourth Office Action of the People's Republic of China for Application No. 201380053676.0 dated Jan. 3, 2018 (16 pages Including English Translation).
European Extended Search Report for Application No. 17201425.0 dated Mar. 1, 2018 (7 pages).
European Partial Search Report for Application No. 17201428.4 dated Mar. 8, 2018 (12 pages).
European Extended Search Report for Application No. 17201428.40 dated Jun. 18, 2018 (10 pages).
Peruvian Office Action for Application No. 000367-2015 dated Jul. 19, 2019 (11 pages including English translation).
Australian Patent Office Examination Report No. 1 for Application No. 2018203820 dated Aug. 12, 2019 (4 pages).
Chinese Patent Office Action for Application No. 201910052648.6 dated May 6, 2020 (13 pages including English translation).
Extended European Search Report for Application No. 19218676.5 dated Apr. 2, 2020 (5 pages).
Extended European Search Report for Application No. 19218632.8 dated Apr. 7, 2020 (7 pages).
Extended European Search Report for Application No. 19218675.7 dated Apr. 3, 2020 (7 pages).
International Mining, "DynaCut Technology Achieving Breakthroughs," <https://im-mining.com/2015/12/17/dynacut-technology-achieving-breakthroughs/> web page accessed Nov. 22, 2019.
Mining3 Mining, "CRCMining Joy Global Oscillating Disc Cutter (ODC) Hard Rock Cutting Machine," <https://www.youtube.com/watch?v=anyPQWkH4rM> web page accessed Oct. 24, 2019.
Brazilian Patent Office Action for Application No. 122020010678 dated May 27, 2020 (58 pages including statement of relevance).
Chinese Patent Office Second Office Action for Application No. 201910052648.6 dated Mar. 4, 2021 (6 pages including English summary).
Chilean Patent Office Action and Search Report for Application No. 202002400 dated Jun. 26, 2021 (14 pages including statement of relevance).

* cited by examiner

CUTTER HEAD FOR MINING MACHINE

CROSS REFERENCE TO RELATED APPLICATION

This application is a continuation of prior-filed, co-pending U.S. patent application Ser. No. 15/266,386, filed Sep. 15, 2016, which is a continuation of U.S. patent application Ser. No. 14/028,511, filed Sep. 16, 2013, which claims the benefit of and priority to U.S. Provisional Patent Application No. 61/701,256, filed Sep. 14, 2012. The entire contents of these applications are incorporated by reference herein.

BACKGROUND

The present invention relates to underground mining machines, and in particular to a cutter head for an underground mining machine.

A hard rock continuous miner includes a cutter head having an oscillating cutting disc. The oscillating disc cutter transmits all of the dynamic cutting forces through the bearings, and the life of the bearings are limited due to the high loads and high speed of the cutting discs. In addition, the oscillating discs require large face seal surface areas in the primary cutting area, while the cutting discs oscillate at frequencies typically around 50 Hz. It is difficult to seal a large area with a high surface velocity, and this is further complicated due to the fact that the cutting operation generates a large amount of highly abrasive rock particles. The combination of the contaminated environment and high surface velocity accelerates wear on the seals and decreases the working life of the seals. Furthermore, the deficiencies in the seals and the highly loaded bearings can combine to even further increase maintenance and replacement of the disc cutter assembly. These factors also limit the frequency and the eccentricity of oscillation of the cutting discs, thereby limiting the total power available for rock cutting In addition, oscillating disc cutter systems typically lack a means for directly monitoring the behavior of the disc cutter at the cutting surface. As a result, it is difficult to sense a change in the cutting conditions (e.g., when the hardness of the rock changes). Thus, the operator is unable to control the disc cutter to optimize the cutting performance.

SUMMARY

In some aspects the invention provides a cutter head for a mining machine including a frame and a boom movably coupled to the frame. The cutter head includes a first member, a cutting bit, and a second member. The first member includes a first end and a second end and includes a first mass. The cutting bit is coupled to the first member proximate the second end and includes a cutting edge. The second member is rotatable about an axis and includes a second mass eccentrically positioned with respect to the axis. The second mass and the first mass at least partially define a combined center of mass. Rotation of the second mass causes the first member and the cutting bit to oscillate about the combined center of mass along a closed path.

In other aspects the invention provides a mining machine including a frame for supporting the machine on a support surface, a boom, and a cutter head. The boom includes a first end coupled to the frame and a second end positioned away from the frame. The cutter head a cutter head coupled to the second end of the boom, the cutter head includes a first member, a cutting bit, and a second member. The first member defines a first end and a second end and includes a first mass and a coupling member supporting the first mass on the second end of the boom. The cutting bit is coupled to the first member proximate the second end and includes a cutting edge. The first member and the cutting bit at least partially define a first mass center. The second member is rotatable about an axis and includes a second mass eccentrically positioned with respect to the axis. The second mass defines a second mass center. The first mass center and the second mass center define a combined center of mass. Rotation of the second mass about the axis causing the first member and the cutting bit to oscillate about the combined center of mass along a closed path.

In still other aspects the invention provides a mining machine including a frame for supporting the machine on a support surface, a boom, a cutter head, and a coupling member. The boom includes a first end coupled to the frame and a second end positioned away from the frame; the second end includes a bracket. The cutter head includes a first member and a cutting bit. The first member includes a first end coupled to the bracket and a second end. The cutting bit is coupled to the first member proximate the second end. The coupling member supporting the first member on the second end of the boom to facilitate oscillation of the cutter head relative to the boom.

In still other aspects the invention provides a cutter head for a mining machine including a frame and a boom movably coupled to the frame. The cutter head includes a first member, a cutting bit, a fluid conduit, and a plurality of nozzles. The first member includes a first end and a second end and is movable relative to the second end. The cutting bit is coupled to the first member proximate the second end. The fluid conduit extends through the first member and is configured to be in fluid communication with a fluid source. The nozzles are positioned on the cutting edge, the nozzles in fluid communication with the fluid conduit.

In still other aspects, the invention provides a method for removing material from a rock wall. The method includes moving a cutting edge through the rock wall to create a first slot in the rock wall; moving the cutting edge through the rock wall to create a second slot in the rock wall, the second slot being separated from the first slot by an uncut portion, the uncut portion defining a base surface attached to the wall; cutting a notch into the base surface of the uncut portion; and applying a force on the uncut portion to break the uncut portion away from the wall.

In still other aspects, the invention provides a method for controlling a mining machine. The method includes sensing a value of an indicator of a cutting efficiency of a cutter head; comparing the sensed value with a desired value; modifying an operating parameter in a first direction from an initial value to a second value; detecting the change in the indicator of cutting efficiency; and when the change in the indicator of the cutting efficiency represents an improvement, modifying the operating parameter further in the first direction to a third value.

In still other aspects, the invention provides a method for controlling a mining machine. The method includes sensing a first value of an indicator of a cutting efficiency of a first cutter; sensing a second value of an indicator of cutting efficiency of a second cutter; comparing the first value with the second value to detect whether the first value is less than the second value; when the first value is less than the second value, modifying an operating parameter of the second cutter so that the second value matches the first value.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

DETAILED DESCRIPTION

Figure 1:
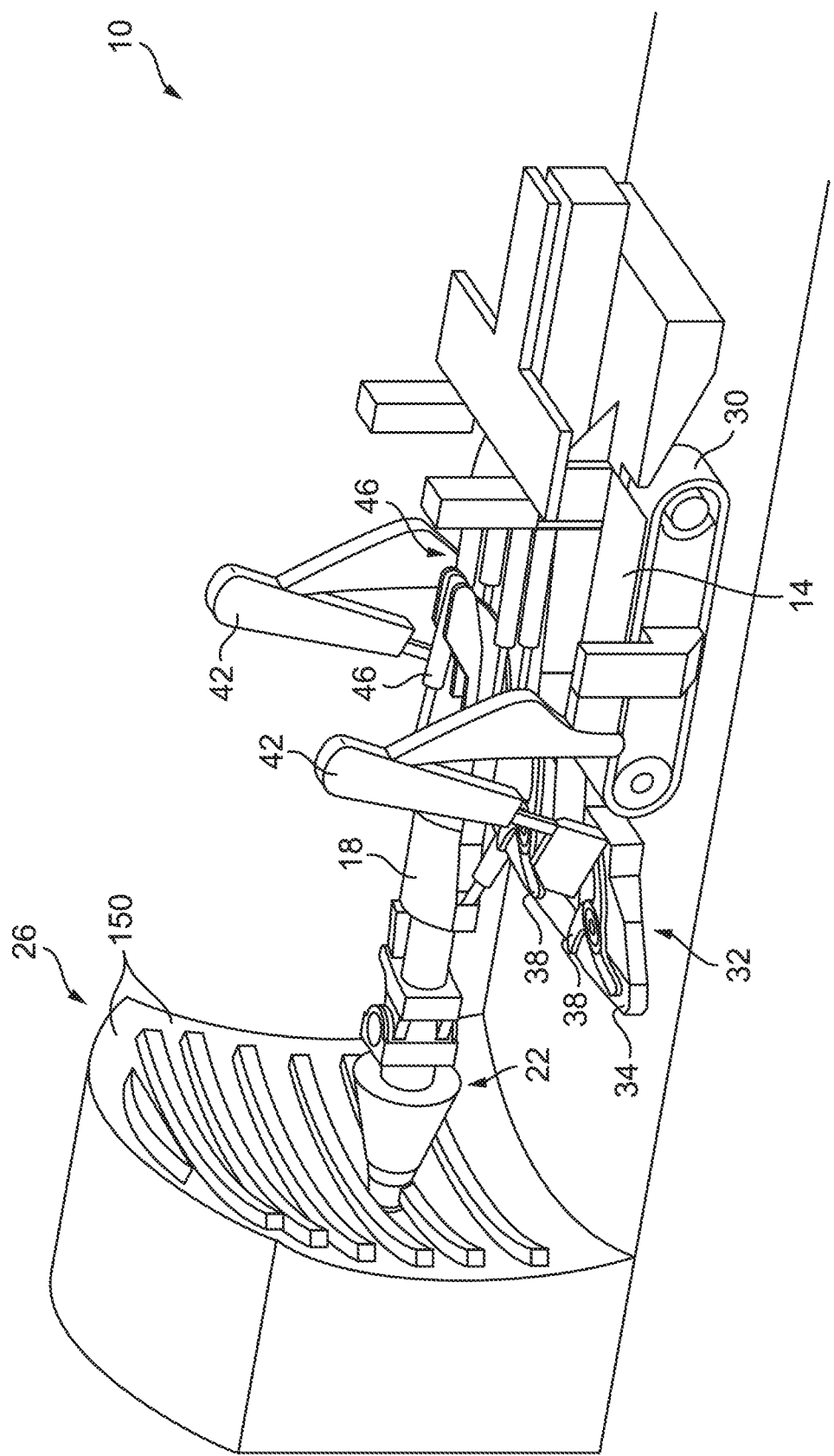
FIG. 1 is a perspective view of a mining machine engaging a mine wall.
Figure 2:
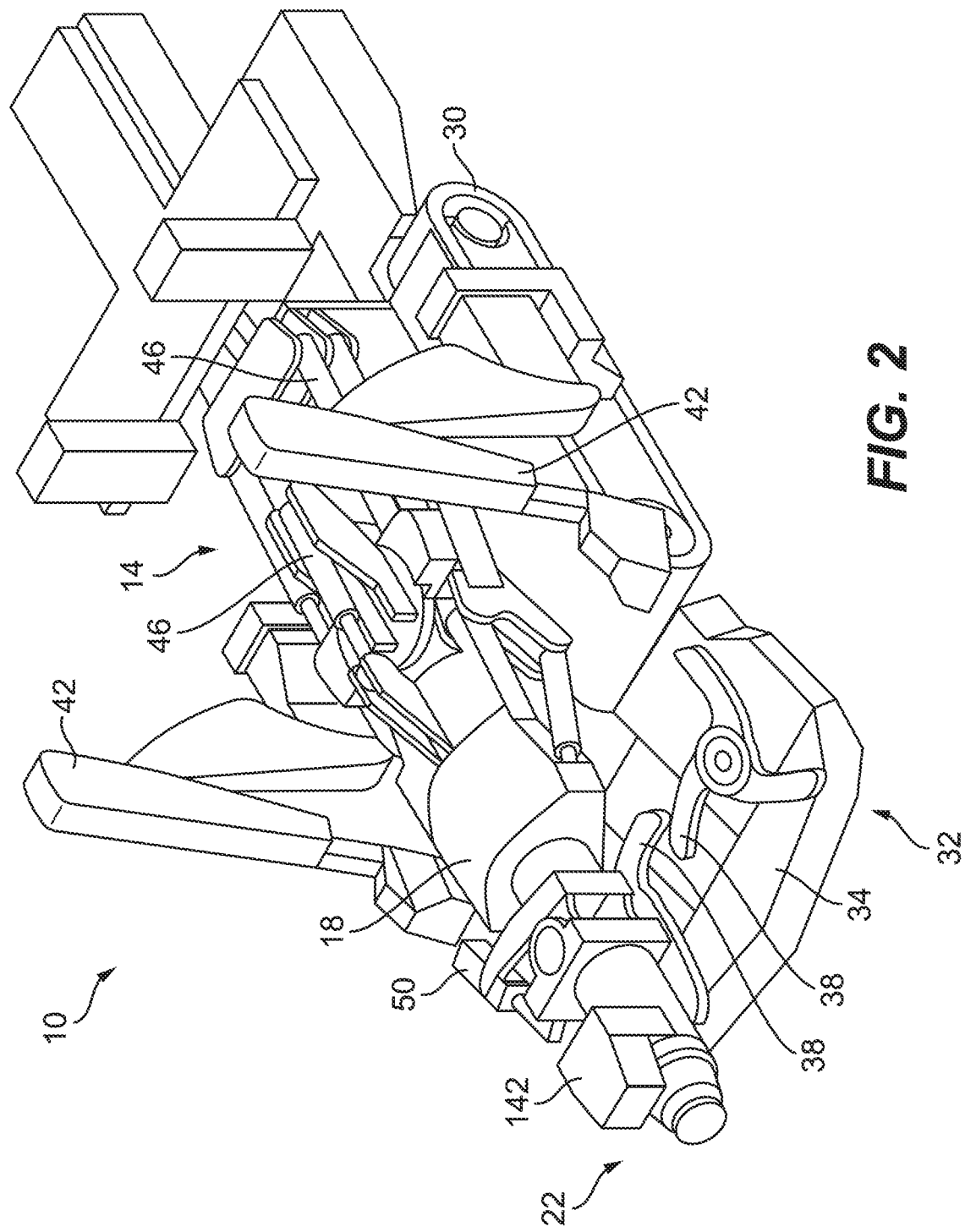
FIG. 2 is a front perspective view of the mining machine of FIG. 1.

As shown in FIGS. 1 and 2, a mining machine 10 includes a frame 14, a boom 18, and a cutter head 22 supported on the boom 18 for engaging a mine wall 26. The frame 14 includes tracks 30 for moving the frame 14 over a support surface or mine floor (not shown). The frame 14 further includes a gathering head 32 positioned adjacent the mine floor proximate the cutter head 22. The gathering head 32 includes a deck 34 and rotating fingers 38 that urge cut material onto a conveyor (not shown). The frame 14 also includes a pair of arms 42 pivotably coupled to the frame 14. The arms 42 can be extended to a position forward of the gathering head 32 in order to direct cut material onto the deck 34.

The boom 18 is pivotably coupled to the frame 14 at one end, and operation of one or more first actuators 46 pivot, extend, and retract the boom 18 relative to the frame 14. In the illustrated embodiment, the first actuators 46 are hydraulic cylinders. Also, in the illustrated embodiment, the boom 18 pivotably supports the cutter head 22 on an end of the boom 18 opposite the frame 14. A second actuator 50 (FIG. 2) pivots the cutter head 22 relative to the boom 18. The cutter head 22 is positioned such that the cutter head 22 engages the mine wall 26 with a controlled force. Operation of the first actuators 46 moves the boom 18 relative to the frame 14, thereby moving the cutter head 22 over the mine wall 26 to produce a desired cutting profile. The angle between the cutter head 22 and the boom 18 is continuously monitored. Sensor data for the angle is provided to a control system for controlling the position of the boom 18. The speed of movement of the boom 18 can be adjusted to match the excavation rate, or the energy delivered to the mine wall 26.

Figure 3:
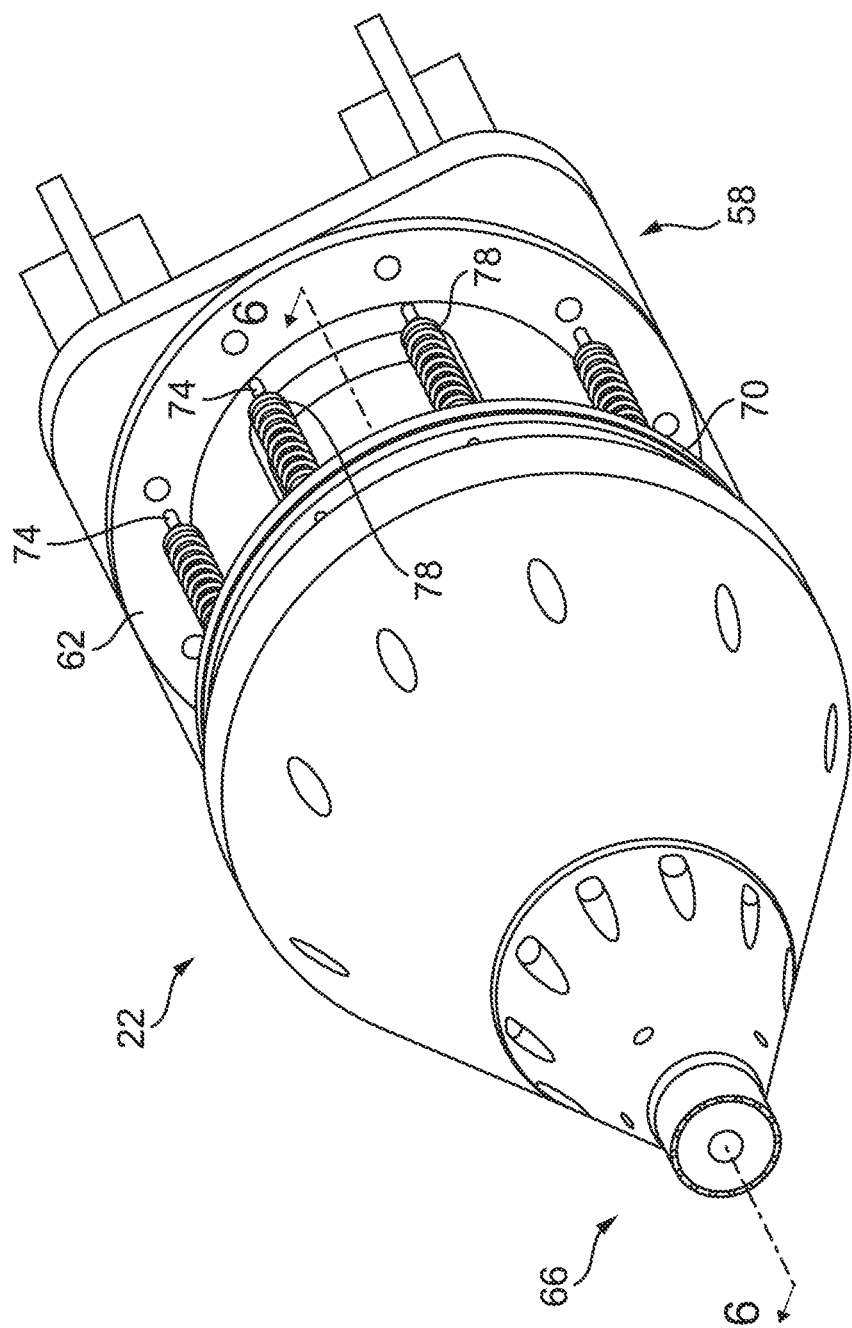
FIG. 3 is a perspective view of a cutter head.
Figure 3A:
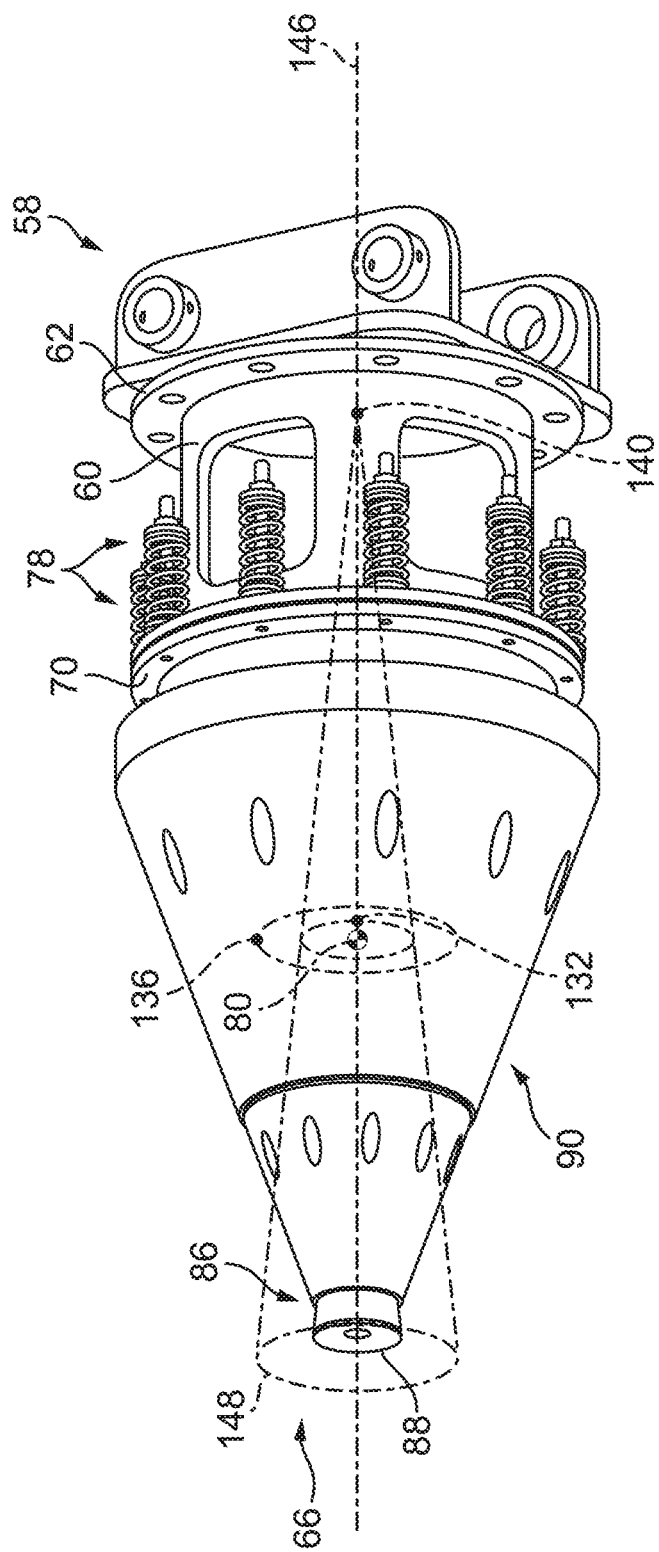
FIG. 3A is a side perspective view of the cutter head of FIG. 3.

As shown in FIG. 3, a coupling member or mounting bracket 58 supports the cutter head 22 for pivoting movement relative to the boom 18 (FIG. 2). In the embodiment of FIG. 3, the cutter head 22 includes a first end 62, a second end 66, and a support plate 70 proximate the first end 62. In the illustrated embodiment the cutter head 22 includes a coupling member or arm 60 for supporting the cutter head 22 on the mounting bracket 58. Multiple pins 74 are positioned around the perimeter of the support plate 70 and extend through the support plate 70 and the arm 60. Each pin 74 supports a spring 78, which reacts to the forces exerted on the cutter head 22 by the mine wall 26. The springs 78 also isolate the boom 18 against transmission of vibrational forces from the cutter head 22. In some embodiments, each pin 74 also supports a damper. Referring to FIG. 3A, the geometry and the mass of the cutter head 22 defines a combined center of mass 80 that is generally positioned between the first end 62 and the cutting bit 86. The size, shape, and density of the components of the cutter head 22 may be modified to adjust the position of the center of mass 80 relative to the cutting bit 86.

In other embodiments, a different type of cutter head (including a cutter head having a conventional oscillating disc cutter) may be coupled to the arm 60 by the pins 74 and springs 78. In still other embodiments, a plate spring or hinge is coupled between the support plate 70 and the boom 18. The plate spring is made from a fatigue-resistant material such as a carbon-fiber composite. The plate spring eliminates the need for mechanical pivots and reduces wear on the coupling, thereby improving the working life.

Figure 4:
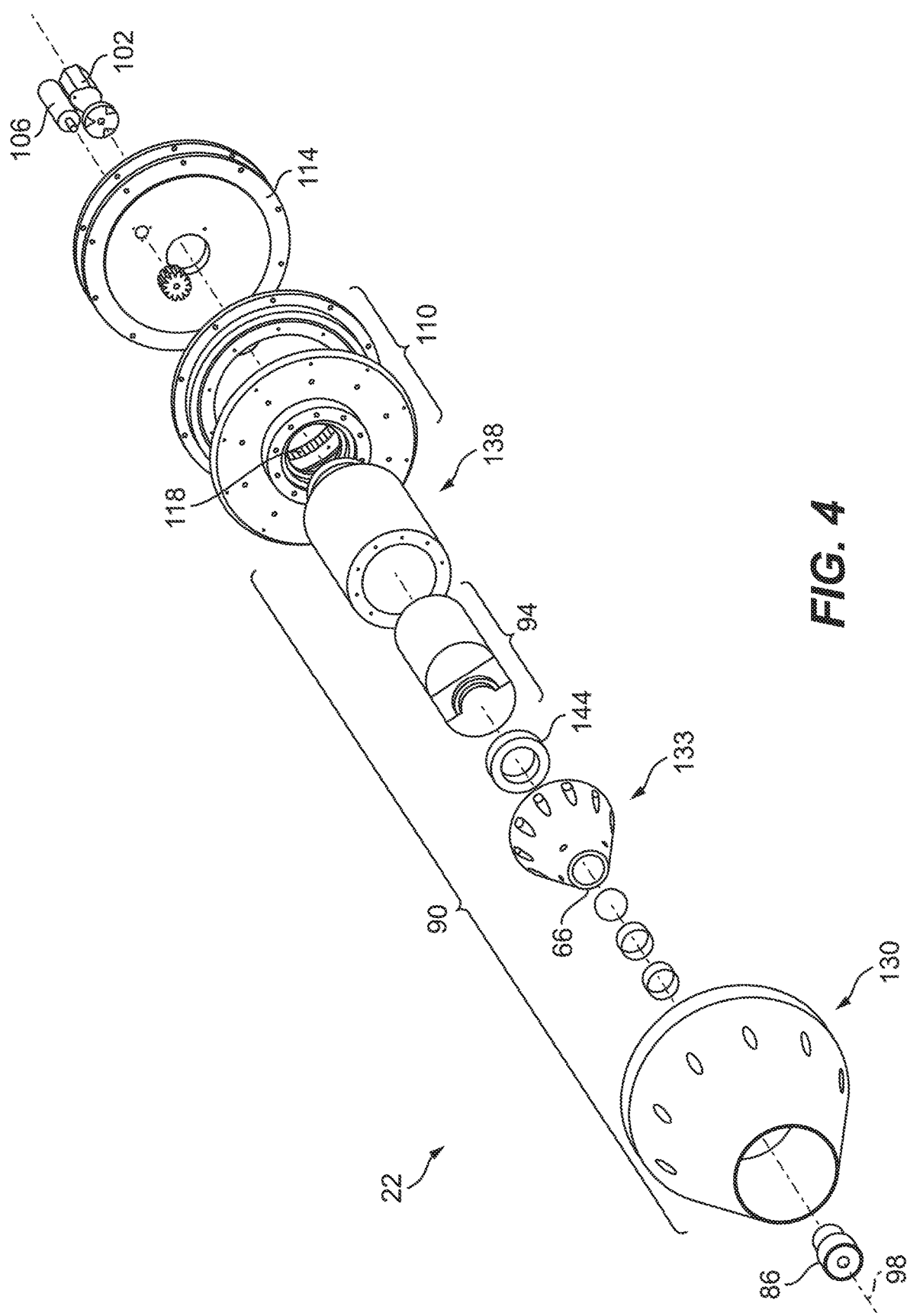
FIG. 4 is an exploded front perspective view of the cutter head of FIG. 3.
Figure 5:
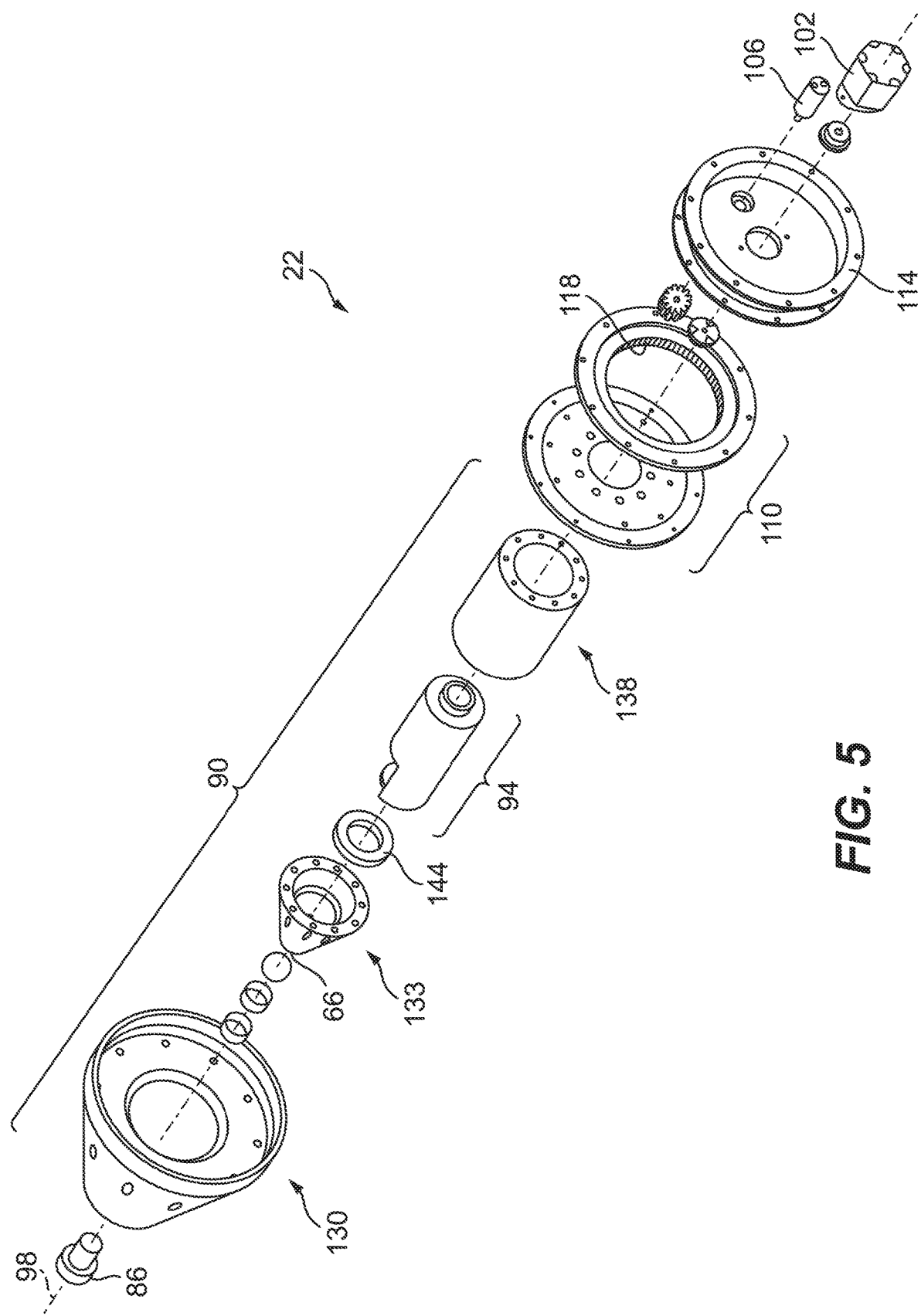
FIG. 5 is an exploded rear perspective view of the cutter head of FIG. 3.
Figure 6:
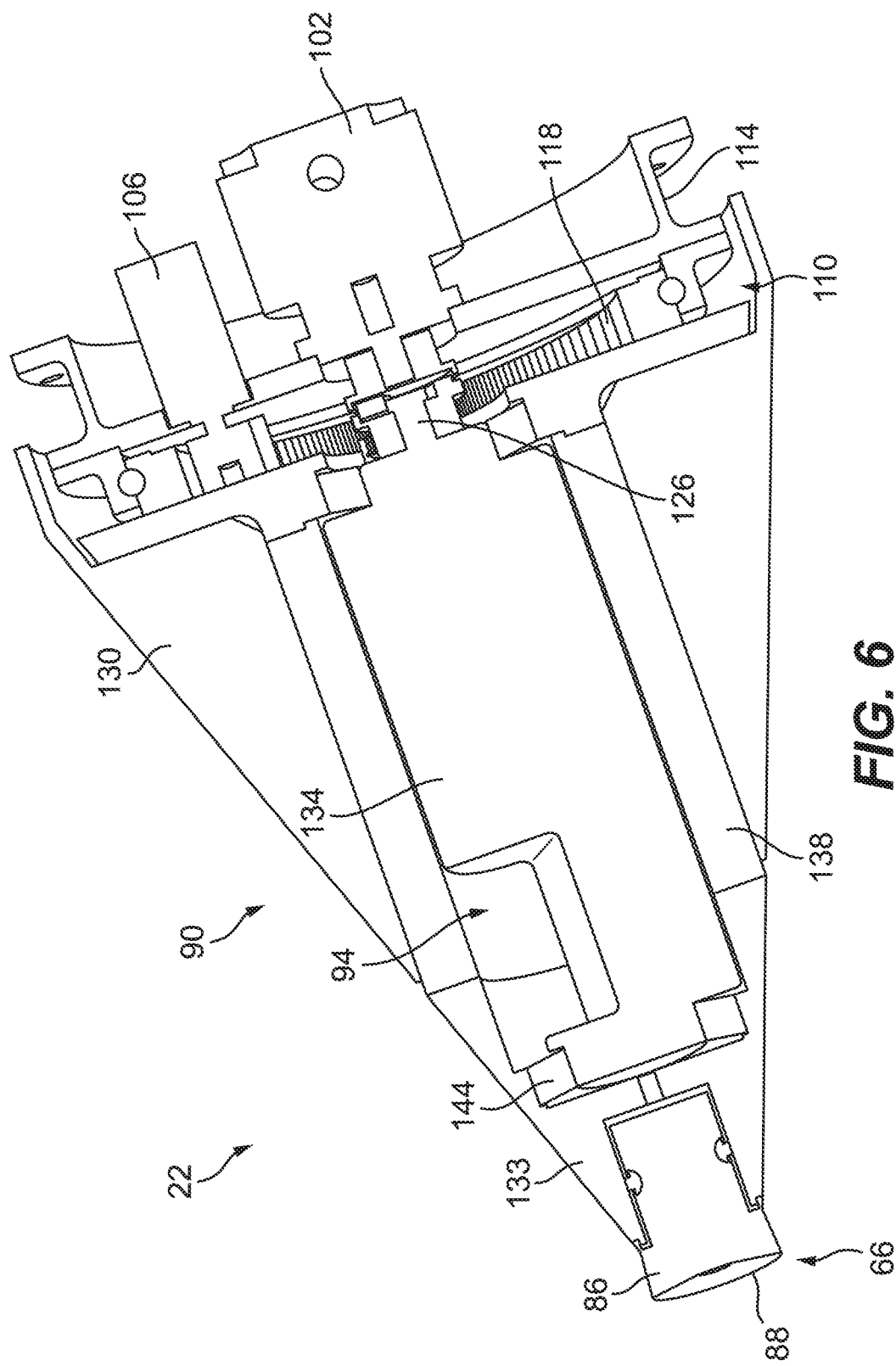
FIG. 6 is a section view of the cutter head of FIG. 3 taken along the line 6-6.

The cutter head 22 is shown in FIGS. 4-6. The cutter head 22 includes a cutting bit 86 proximate the second end 66, a first or inertial member 90 coupled to the cutting bit 86, and a second or exciter member 94. In the illustrated embodiment, the cutting bit 86 is formed as a ring or disc that is secured to the inertial member 90 to move with the inertial member 90. The cutting bit 86 includes a cutting edge 88 (FIG. 6). The cutter head 22 further includes a first motor 102, a second motor 106, a slew plate or bearing 110 coupled to the inertial member 90, and a support plate 114 for supporting the first motor 102 and the second motor 106. The slew bearing 110 includes a ring gear 118 that is driven by the second motor 106. As best shown in FIG. 6, the first motor 102 drives a first shaft 126 (FIG. 6) to rotate the exciter member 94 about an axis of rotation 98. In one embodiment, the second motor 106 rotates the ring gear 118 and the inertial member 90 about the axis 98.

In the embodiment of FIGS. 4-6, the inertial member 90 has a generally frusto-conical shape and tapers in a direction from the first end 62 toward the second end 66. More particularly, the inertial member 90 includes a main body 130, a housing 133 positioned proximate a narrow end of the main body 130, and a sleeve 138 that is positioned within the body 130 and is coupled to the housing 133. The housing 133 supports the cutting bit 86 proximate the second end 66 of the cutter head 22. In other embodiments, the inertial member 90 may have another construction.

The tapered shape provides clearance for the cutting bit 86 to engage the mine wall 26 while still permitting the boom 18 to position the cutter head 22 and produce an optimum cutting profile. The position and shape of the inertial member 90 are inter-related design factors, and the tapered shape allows a minimum amount of mass to provide a relatively high "equivalent" mass or moment of inertia. In addition, the tapered shape facilitates cutting along tight corners and performing cut-and-break mining as described in more detail below. It is understood that the cutter head 22 could be used for cutting a mine wall according to other methods (i.e., the cutter head 22 is not limited to cut-and-break mining methods). In general, the tapered shape provides a versatile cutter head 22 that permits a variety of cutting profiles while positioning the inertial member 90 as close to the cutting bit 86 as practicable to improve the efficiency of the cutting operation.

In other embodiments, the inertial member 90 may have a different shape or position, depending on the tunnel dimensions, the geometry of the boom, and the optimum effective mass. The inertial member 90 may include other configurations, such as a rotating overhung mass 142 (illustrated in FIG. 2) that allows clearance in the cutting process, or a plate shaped mass.

Referring to FIG. 6, the exciter member 94 is positioned within body 130 and particularly within the sleeve 138 of the inertial member 90. The exciter member 94 is supported for rotation relative to the inertial member 90 by high-speed bearings 144. The exciter member 94 is elongated and coupled to the first shaft 126 for rotation about the axis of rotation 98. The exciter member 94 is a non-contact eccentric and includes at least one lobe 134 that is eccentrically positioned with respect to the axis of rotation 98.

The exciter member 94 is rotated by the first motor 102, and the rotation of the exciter member 94 "excites" the inertial member 90 and the connected cutting bit 86 and induces a desired oscillation in the inertial member 90 and cutting bit 86. As shown in FIG. 3A, the inertial member 90 defines a first mass center 132 that oscillates or orbits about the combined center of mass 80 at a first effective radius. The exciter member 94 defines a second mass center 136 that oscillates or orbits about the combined center of mass 80 at a second effective radius. As shown, movement of the exciter member 94 causes the second mass center 136 to orbit about the combined center of mass 80, thereby causing the first mass center 132 to orbit about the combined center of mass 80. In the illustrated embodiment, the second mass center 136 has a larger effective radius than the first mass center 132. The cutter head 22 moves in circular movement about a point 140. Stated another way, a reference line 146 extending between the cutting bit 86 and point 140 traces a conical shape as the first mass center 132 oscillates, and the cutting bit 86 moves in a closed path 148 having a dimension that is proportional to the eccentricity of the oscillating motion induced on the inertial member 90. In the illustrated embodiment, the path 148 is circular. The reference line 146 defines a radius of the cutting bit 86 from the point 140, and the point 140 defines the apex of the conical shape while the cutting bit 86 moves along the base of the conical shape.

More specifically, the dimension of the path 148 is proportional to the mass of the exciter member 94 and the eccentricity (i.e., axial offset) of the exciter member 94. The dimension is also inversely proportional to the mass of the inertial member 90. For example, in one embodiment the inertial member 90 has an effective mass of 1000 kg at the cutter, while the exciter member 94 has an effective eccentric mass of 40 kg at the cutter and an eccentricity (i.e., an amplitude of eccentric oscillation) of 50 mm. The resultant oscillation of the inertial member 90 is proportional to the product of the mass and eccentricity of the exciter member 94 divided by the mass of the inertial member 90; therefore the excitation causes the inertial member of 1000 kg to oscillate or vibrate with an amplitude of ±2 mm (i.e., the radius of the path 148 of the cutting bit 86 is 2 mm). In other embodiments, the relative masses of the inertial member 90 and the exciter member 94 as well as the eccentricity of the exciter member 94 can be modified to produce a desired oscillation response in the inertial member 90.

When the cutting bit 86 contacts mine wall, the wall exerts a reaction force on the cutting bit 86 that resists the oscillating motion of the inertial member 90. To compensate, the feed force is exerted on the cutter head 22 by the boom 18 to urge the cutting bit 86 towards the wall. The oscillation of the inertial member 90 and the exciter member 94 is controlled so that the inertial member 90 has a maximum velocity in the direction of the cut when the cutting bit 86 engages the mine wall.

The cutter head 22 directly secures together the inertial member 90 and the cutting bit 86. Unlike conventional oscillating disc cutters in which all of the dynamic cutting forces are transmitted from a cutting bit and through a bearing arrangement into an inertial mass, the cutter head 22 provides a direct connection between the cutting bit 86 and the inertial member 90. This direct connection permits the inertial member 90 to absorb a significant amount of the dynamic cutting force before the load is transmitted to the bearings 110, 144, thereby reducing the load on the bearings 110, 144. In one embodiment, the high-speed bearing 144 is subject to approximately 5% of the total dynamic cutting forces. The bearings 110, 144 are also sealed from the rock cutting zone. Furthermore, the cutter head 22 eliminates dynamic seals in the primary rock cutting zone operating at high speed over large areas. As a result, it is possible to increase both the frequency and the eccentricity of cutter head 22 while also improving the working life of the cutter head 22. Therefore, the cutter head 22 improves the efficiency of the cutting operation. The increased frequency and eccentricity permit the cutting bit 86 to exert more dynamic power on the wall to break rock without requiring larger cutter components.

In one embodiment, the frequency (i.e., rotational speed) and the mass of the inertial member 90 as well as the feed force provided by the boom 18 are generally the same as that of a conventional oscillating disc cutter, but the mass and eccentric radius of the exciter member 94 are increased. The increased excitation increases inertial member 90 travel (i.e., oscillation amplitude) and results in greater impact energy for the rock cutting process. In one embodiment, the impact energy is three to four times more than the impact energy provided by a conventional oscillating disc cutter.

Alternatively, a smaller cutter head 22 can be used to generate the same cutting forces as a conventional cutter head, permitting a lower cost machine that can access and operate in tightly constrained areas of the underground mine. For example, in one embodiment, the inertial member 90 is sized with the same mass and oscillates at the same frequency as a conventional oscillating disc cutter, but only requires half of the feed force (i.e., the external force applied to the cutter head by the boom 18) to impart the same amount of energy into the rock.

Figure 7:
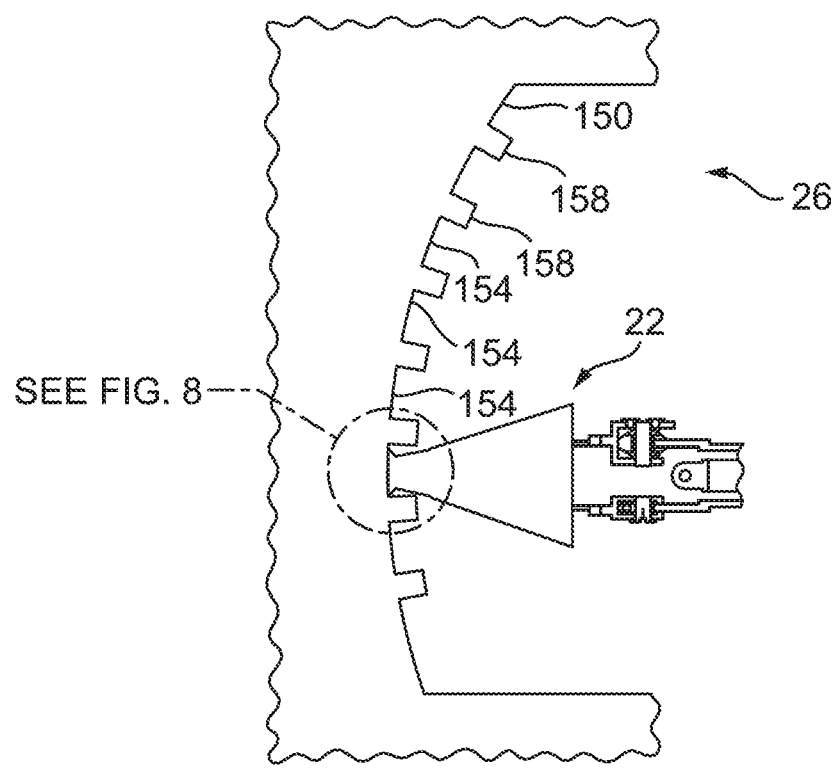
FIG. 7 is a side view of a cutter head engaging a mine wall.
Figure 8:
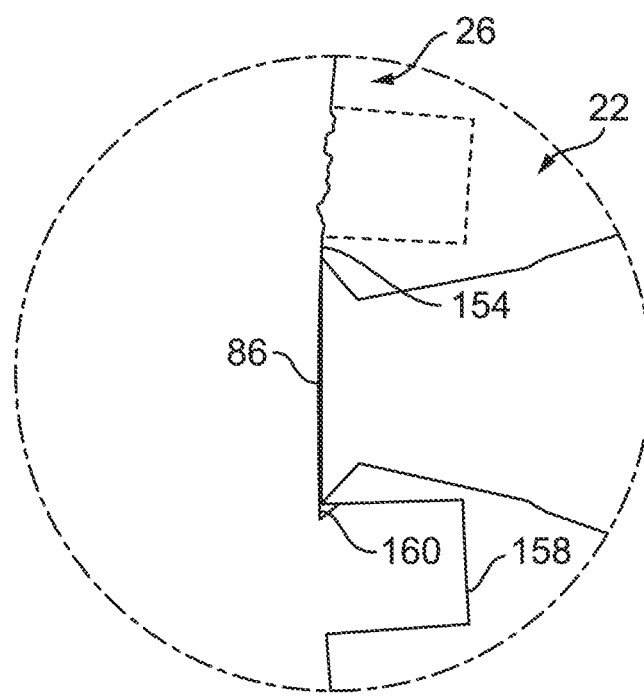
FIG. 8 is an enlarged side view of a cutter head engaging a mine wall.

FIGS. 1, 7, and 8 illustrate a method for cutting rock from the mine wall 26. Although the method described below refers to the cutter head 22, it is understood that the method may be performed using a cutter head having a different shape or disc cutter configuration, such as a conventional oscillating disc cutter. In one embodiment, the perimeter of the mine wall 26 is first cut (i.e., a wall relief cut) to define a profile 150 (FIG. 1) of the mine wall 26. The profile 150 may be cut by multiple passes of the cutter head 22 in order to increase the depth to a desired level, such as the maximum practical cutting depth of the cutter head 22. In one embodiment, the depth of the cut is in the range of approximately 200 mm to approximately 400 mm. After the profile 150 is formed, the cutter head 22 subsequently cuts multiple slots 154 into the mine wall 26, leaving uncut rock sections 158 adjacent the slots 154. Cutting the slots 154 may require multiple passes in order to cut the slots 154 to the desired depth. In the illustrated embodiment, the slots 154 are cut in a generally horizontal direction. In other embodiments, the slots 154 may be cut vertically or at an angle across the mine wall 26 in order to facilitate fracturing. Also, the terms "tall", "high", and "height" as used herein to describe this method generally refer to a vertical dimension of the slots 154 and the uncut sections 158 as shown in the embodiment of FIGS. 1, 7 and 8. Although the embodiment illustrated in these figures shows the slots 154 and uncut sections 158 in a substantially horizontal orientation, it is understood that the slots 154 and uncut sections 158 could be formed in a different orientation, in which case other terms may be used to refer to the transverse dimension of these features.

As the cutter head 22 makes a final cutting pass through a slot 154, (e.g., as the cutter head 22 cuts the slot 154 to a desired depth), the protruding (i.e., uncut) rock sections 158 above and below the slot 154 are undercut and overcut, respectively, to a maximum allowable depth of the cutting bit 86. That is, a base of each side of the rock section 158 is notched to create a fracture line adjacent the mine wall 26 (FIG. 7). The ends of the protruding rock section 158 are similarly relieved during the perimeter cut. After forming the initial notch 160, the cutter head 22 contacts the protruding rock section 158. The force exerted on the cutter head 22 by the boom 18 and/or the vibration of the inertial member 90 causes the protruding rock section 158 to break away from the wall 26. Alternatively, the mining machine 10 may include a breaker attachment (for example, mounted on a separate boom from the cutter head) that is applied against the rock section 158 to break the rock section 158 along the fracture line.

Unlike conventional methods that require cutting virtually all of the rock on the mine wall 26, the method described above permits the operator to selectively cut rock in such a way to maximize the potential for rock fracturing, and subsequently breaking uncut rock sections 158. Depending on the type of rock, the presence of shear planes, and the size of the mine wall 26, the "cut-and-break" method described above can mine the rock such that the ratio between the amount of rock that is broken from the wall 26 to the amount of rock that is cut from the wall 26 exceeds 1:1. That is, the method requires cutting less than half of the rock that is removed from the wall 26. The method substantially reduces cutting time and energy consumption, and also reduces the wear on the cutting bit 86 and other components of the cutter head 22. In some embodiments, the method described above more than doubles the productivity in underground entry development, when compared with conventional rock cutting processes.

In one embodiment, the cutting bit 86 has a diameter of 400 mm and cuts a slot 154 that is nominally 400 mm tall and 250 mm deep, leaving uncut protruding rock sections 158 that are 200 mm tall and 250 mm deep. The cutter velocity is approximately 100 mm per second and cuts a depth of 50 mm per pass. The mine wall 26 is generally about 5 m wide by 4.8 m tall. The protruding sections 158 are broken from the mine wall 26 as described above. The cutting method according to this embodiment requires cutting at least 25% less rock than conventional hard rock cutting methods. This configuration (i.e., a wide cutting bit diameter and narrower uncut rock sections 158) may be particularly useful for mining extremely hard, competent rock (i.e., rock into which unsupported openings may be cut).

In another embodiment, the cutting bit has a diameter of 250 mm and cuts a slot 154 that is nominally 250 mm tall and 250 mm deep, leaving protruding uncut rock sections 158 that are generally 400 mm tall and 250 mm deep. The protruding sections 158 are then broken as described above. The cutting method according to this embodiment requires cutting less than half of the rock than would be cut using conventional hard rock cutting methods. This configuration (i.e., a narrower cutting bit diameter and relatively wide uncut rock sections 158) may be particularly useful for mining hard rock with shear planes and fractures, or rock that has medium strength.

Furthermore, the cut-and-break method provides cuts or slots 154 that are separated by uncut rock sections 158, permitting a mining machine 10 to incorporate additional cutter heads 22 supported on additional booms 18 and operating simultaneously, effectively doubling the cutting rate. In addition, each of the cutter heads 22 in a multiple cutter head arrangement can operate toward one another, effectively counteracting the majority of cutting-induced boom forces that are typically transmitted through the machine 10 and into mine floor or the surrounding rock mass. Also, an embodiment including two cutter heads 22 supported on separate booms 18 can impart much larger forces on the protruding rock sections 158, thereby increasing the allowable height of the protruding rock section 158 to be broken. Each boom 18 can simultaneously impart loads from an undercut and an overcut position. By maintaining separation between the centers of the booms 18, the cutter heads 22 apply a torque on the rock in addition to exerting a direct force and dynamic cutting action.

Figure 9:
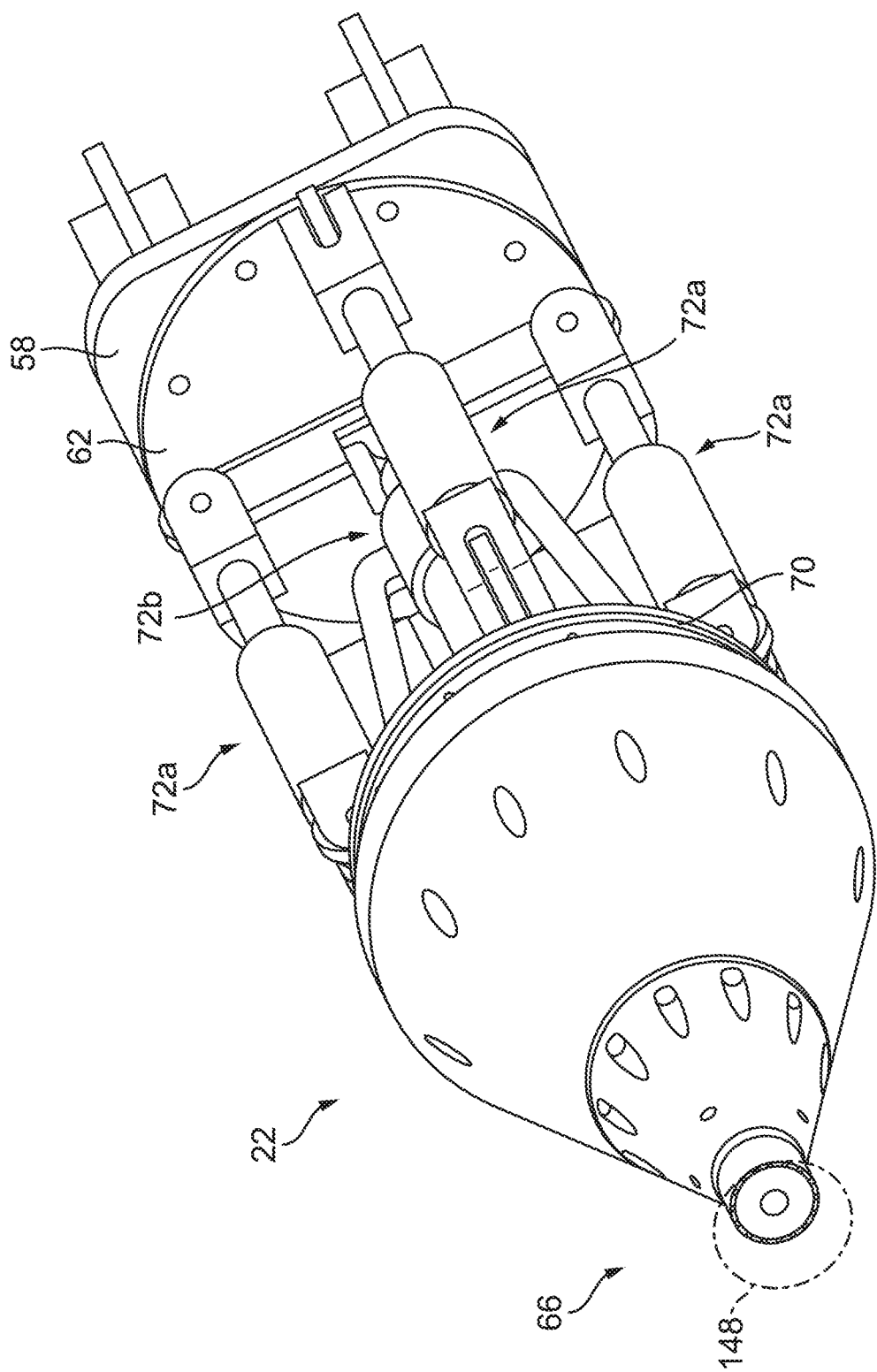
FIG. 9 is a perspective view of a cutter head according to another embodiment.

FIG. 9 illustrates another embodiment in which the cutter head 22 includes an arm 60 coupled to the mounting bracket 58 and supported by multiple hydraulic cylinders 72. The illustrated embodiment includes four hydraulic cylinders 72a positioned at approximately 90 degree intervals around the perimeter of the cutter head 22. The arm 60 includes a fifth cylinder 72b extending from the center of the support plate 70 to the mounting bracket 58, and the cutter head 22 oscillates about a point 140 at the joint between the cylinder 72b and the mounting bracket 58. Other embodiments may include fewer or more hydraulic cylinders. The cylinders 72 are coupled to one or more hydraulic accumulators (not shown) such that the cylinders 72 behave similar to the springs 78 to react to the forces exerted on and by the cutter head 22. In addition, the hydraulic cylinders 72a can be actuated to pivot the cutter head 22 relative to the mounting bracket 58, and the center cylinder 72b extends the cutter head 22 relative to the mounting bracket 58.

The operation of the cylinders 72 provides omni-directional control of the cutter head 22 in order to maintain a desired orientation of the cutter head 22 relative to the mine wall 26 (i.e., the angle of attack). In addition, the cylinders 72 can more accurately sense the force feedback from the cutter head 22, providing accurate measurement of the cutting force exerted by the cutter head 22 and permitting the operator to more precisely control the cutting force. An automated system controls the cutting force based on various factors, such as oscillation frequency or speed, mass of the inertial member, and eccentricity of the exciter member. In other embodiments, a different type of cutter head (including a cutter head that does not include the exciter mass) may be coupled to the mounting bracket 58 by the cylinders 72.

Figure 10:
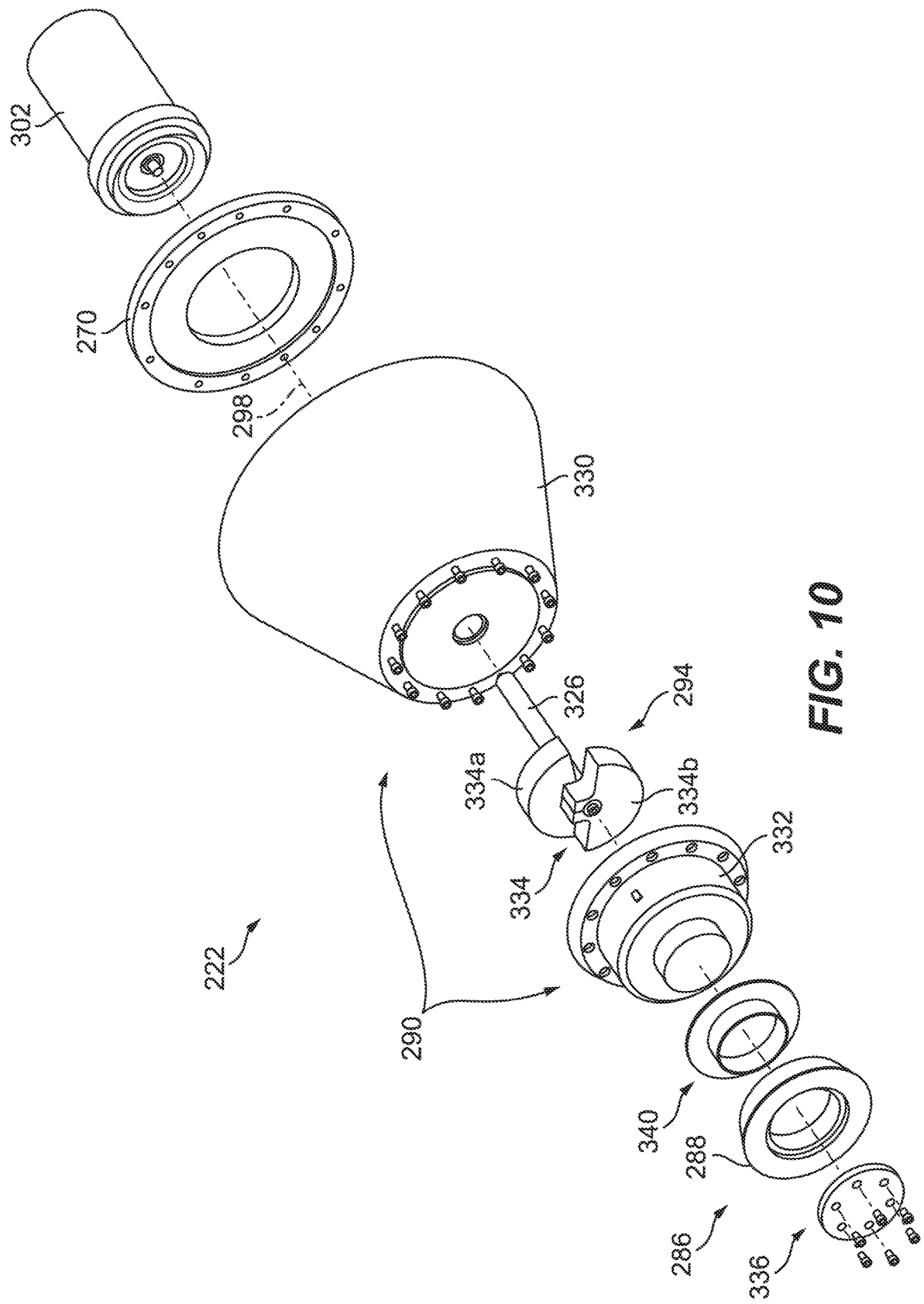
FIG. 10 is an exploded perspective view of a cutter head according to another embodiment.
Figure 11:
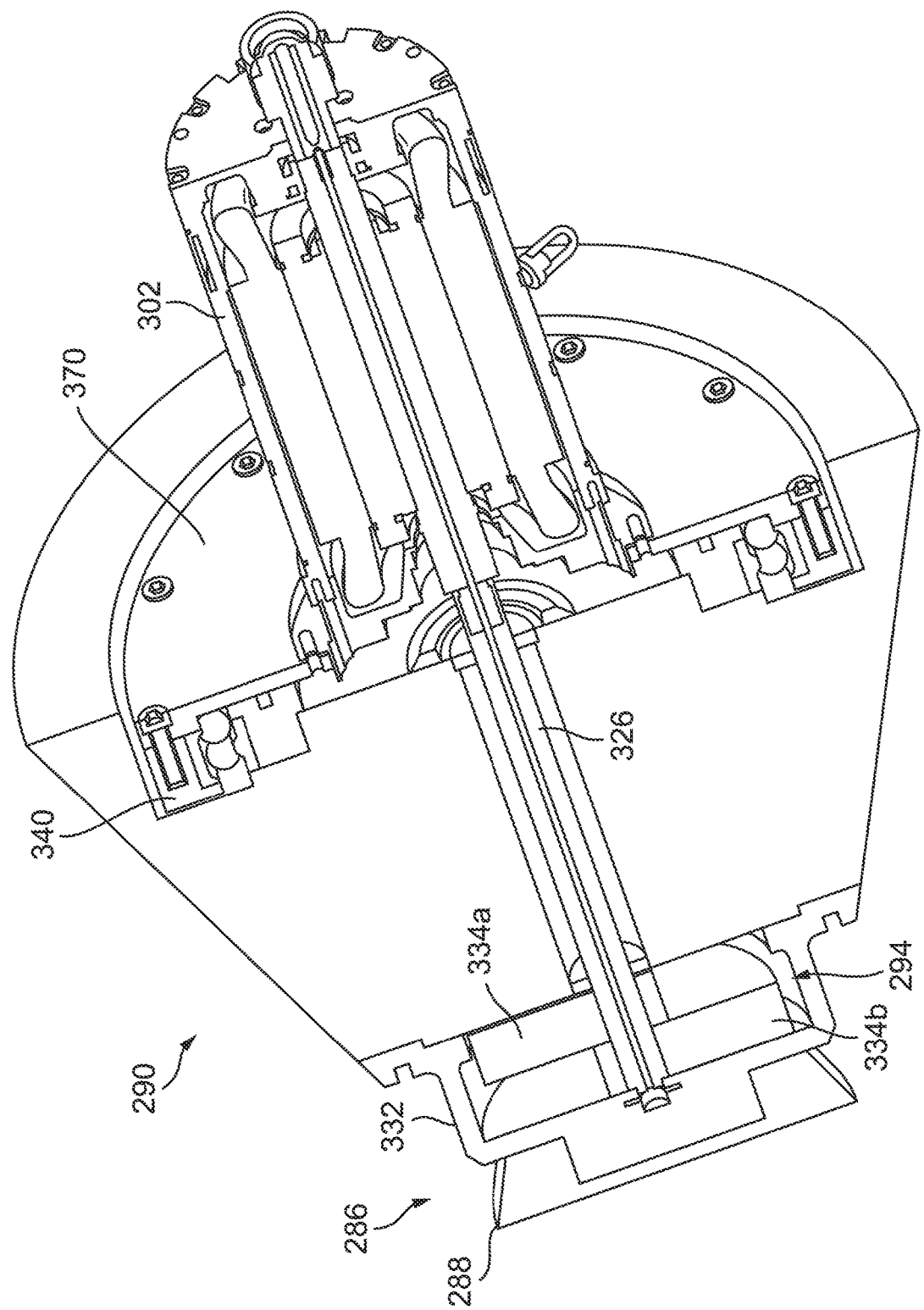
FIG. 11 is a section view of the cutter head of FIG. 10 taken along the line 11-11.

FIGS. 10 and 11 illustrate a cutter head 222 according to another embodiment. The cutter head 22 is generally similar to the cutter head 22 described above with respect to FIGS. 4-6, and similar features are identified by similar reference numbers, plus 200.

As shown in FIGS. 10 and 11, the cutter head 222 includes a cutting bit 286, an inertial member 290, an exciter member 294, and a motor 302 for driving the exciter member 294. The inertial member includes a body 330 and a cap 332 coupled to an end of the body 330. The cutting bit 286 generally has a ring or annular shape and includes a cutting edge 288. The cutting bit 286 is coupled to an end of the cap 332 by a retaining ring 336 (FIG. 10). A radial and thrust bearing plate 340 (FIG. 10) is positioned between the cutting bit 286 and the end of the cap 332 to support the cutting bit 286 for rotation relative to the cap 332. The bearing plate 340 supports the cutting bit 286 against radial and axial loads. The exciter member 294 includes an eccentric mass 334 coupled to a shaft 326. In the illustrated embodiment, the mass 334 has two lobes 334a, 334b that are eccentrically positioned with respect to the axis of rotation 298. The shaft 326 is driven about the axis 298 by the motor 302. The motor 302 is coupled to a support plate 270 of the cutter head 222.

In the embodiment of FIGS. 10 and 11, only the exciter member 294 is driven by the motor 302; the cutter head 222 does not include an external motor to directly drive the inertial member 290. However, the inertial member 290 is rotatably coupled to the support plate 270 by a bearing 308, and therefore the inertial member 290 is freely rotatable. In addition, the cutting bit 286 is freely rotatable relative to the inertial member 290 due to the bearing plate 340. The inertial member 290 rotates about the axis 298 due to oscillation induced by the rotation of the exciter member 294. The cutting bit 286 rotates at a relatively low speed due to the reaction forces exerted on the cutting bit 286 by the rock of the mine wall. In one embodiment, the cutting bit has a diameter of 400 mm and rotates at a speed of approximately 30 RPM.

Figure 12:
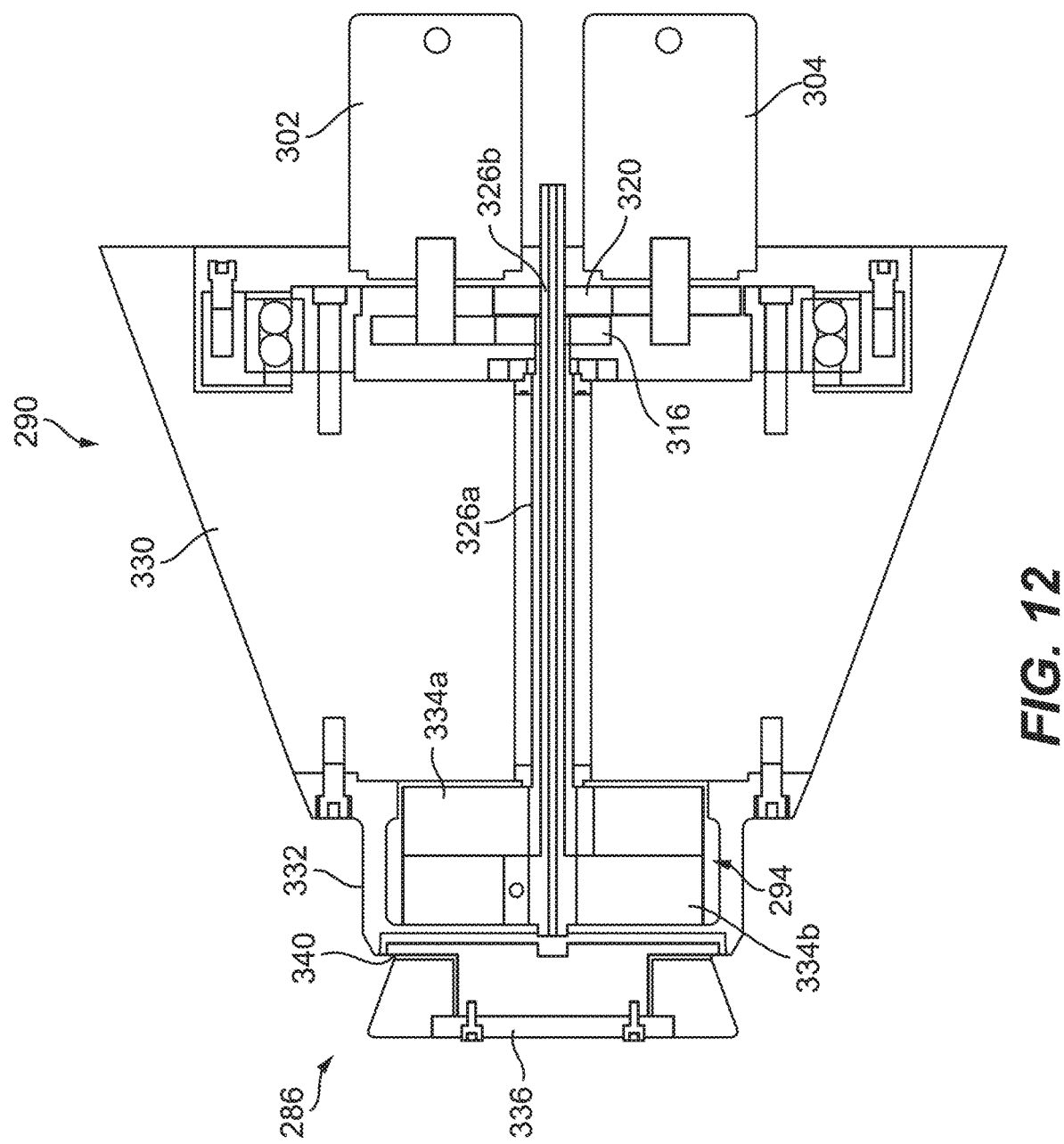
FIG. 12 is a section view of a cutter head according to another embodiment.

In another embodiment, shown in FIG. 12, the lobes 334a, 334b of the exciter member 294 rotate independently of one another. The first motor 302 engages a first gear 316 that is coupled to a first or outer shaft 326a. The first lobe 334a is coupled to the outer shaft 326a, and operation of the first motor 302 drives the first lobe 334a to rotate about the axis 298. The cutter head 222 also includes a second motor 304 engaging a second gear 320 that is coupled to a second or inner shaft 326b. The second lobe 334b is coupled to the inner shaft 326b, and operation of the second motor 306 drives the second lobe 334b to rotate about the axis 298. The relationship between the lobes 334a, 334b can be tuned to provide a desired moment of inertia. For example, the lobes 334a, 334b can be moved to diametrically opposed positions (i.e., the angle between the lobes 334a, 334b is 180 degrees). If the lobes 334a, 334b have the same mass, this configuration effectively cancels or "turns off" the excitation. When the lobes 334a, 334b are positioned in the same relative position about the shaft 326, the maximum power is delivered to the inertial member 290.

In other embodiments, the lobes 334a, 334b are counter-rotating such that the lobe 334a rotates about the axis 298 in a first direction while the other lobe 334b rotates about the axis 298 in an opposite second direction. When the counter-rotating lobes 334a, 334b have the same mass, the cutter head 222 produces a jackhammer-like action on the cutting edge of the cutting bit. Due to the configuration of the cutting bit 286, the jackhammer effect acts at a 90 degree angle. Alternatively, if the lobes 334a, 334b have different masses, the counter-rotating exciter member 294 will drive the edge of the cutting bit 286 along a path 148 (FIG. 3A) having an elliptical shape.

Figure 13:
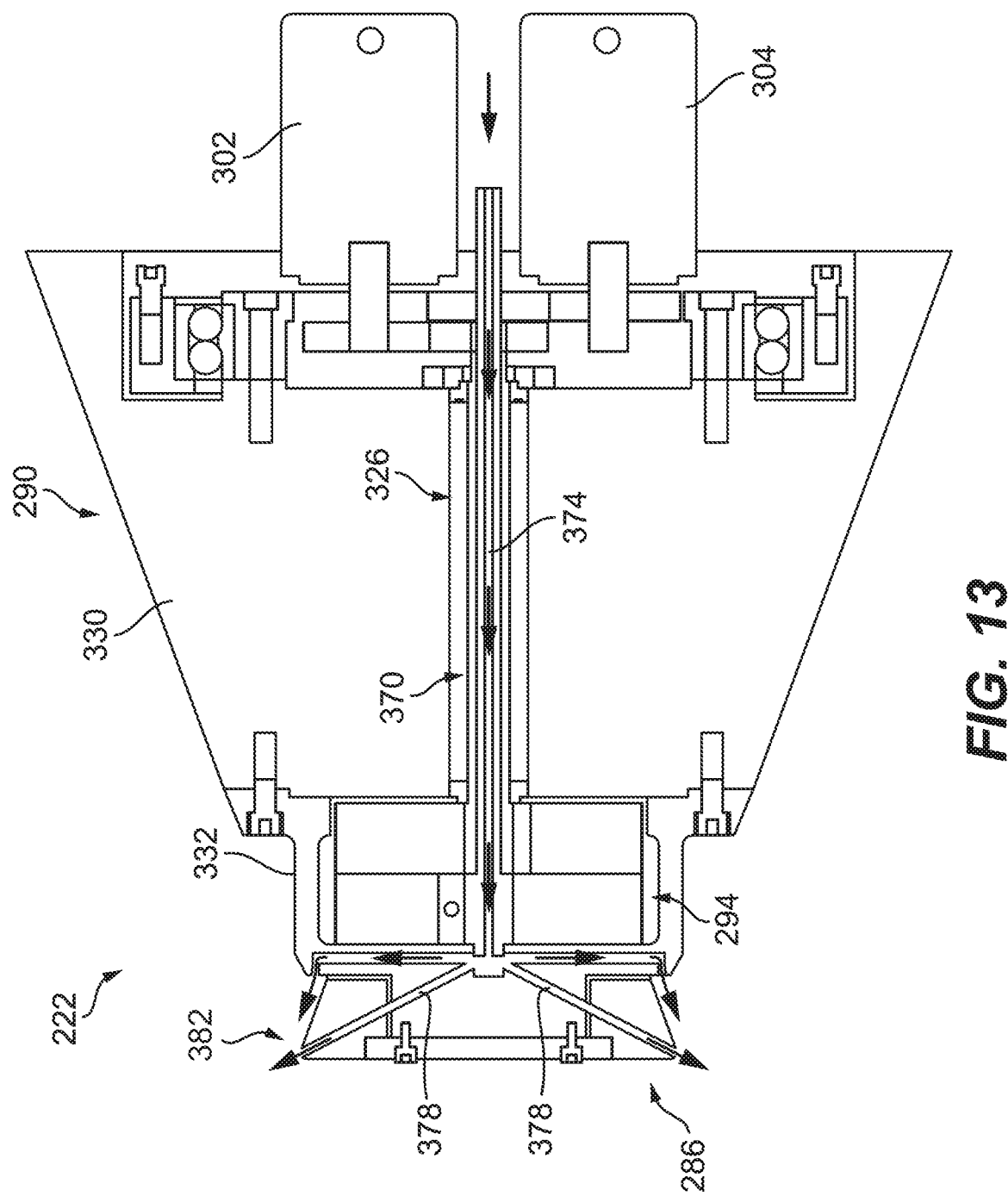
FIG. 13 is a section view of the cutter head of FIG. 12 showing a fluid flow path.
Figure 14:
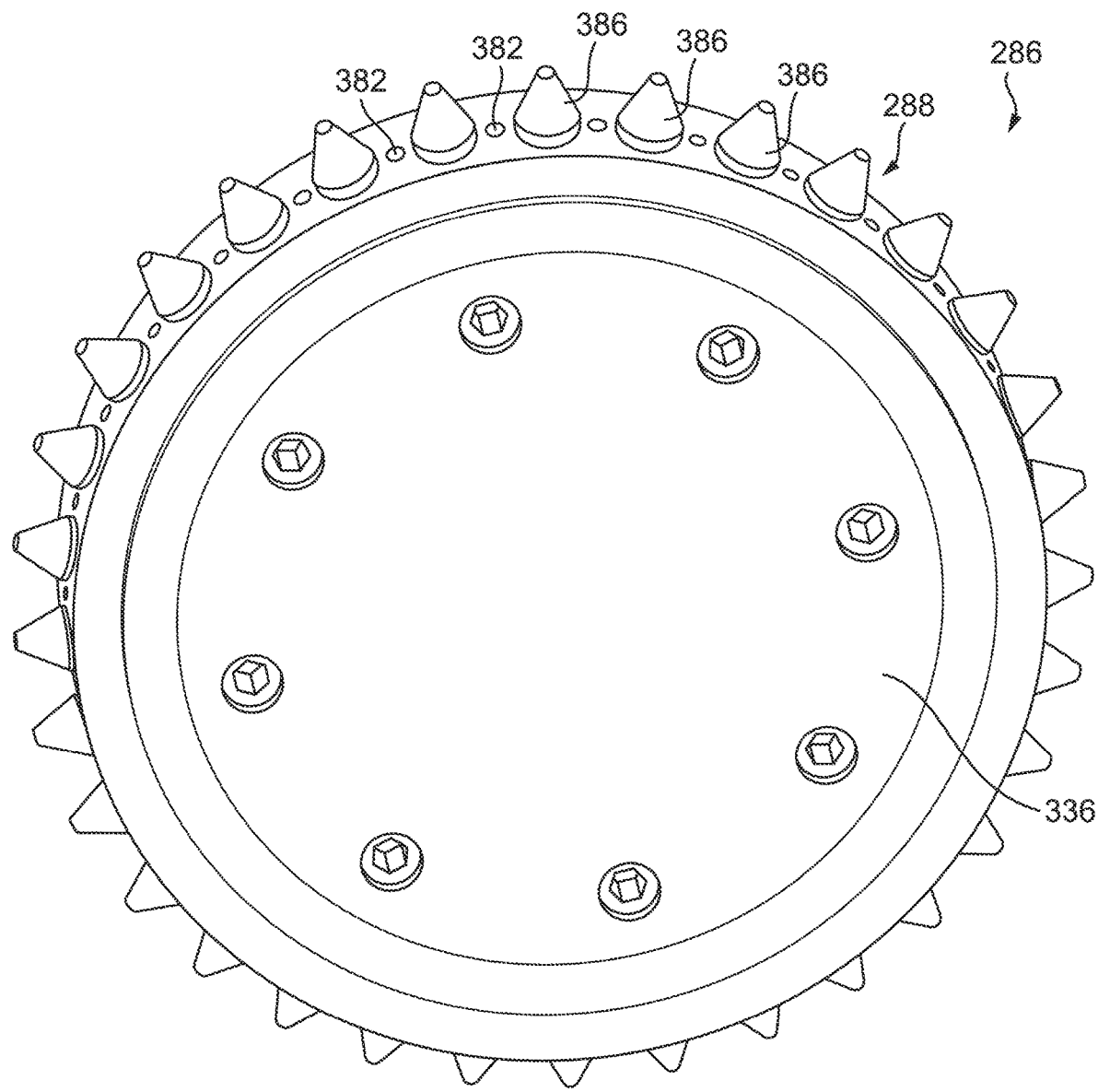
FIG. 14 is a perspective view of a cutting bit.

As shown in FIGS. 13 and 14, the cutter head 222 includes an internal fluid flow path 370 for a cutting clearance system. The flow path 370 is in fluid communication with a fluid source, such as a pump (not shown). The flow path 370 includes a first passage 374 extending through the shaft 326 of the exciter member 294 and multiple second passages 378 extending through the cutting bit 286. In the illustrated embodiment, the first passage 374 extends into a ring carrier of the cutting bit 286 and is in fluid communication with the second passage 378. The second passages 378 extend radially (i.e., in a direction that is non-parallel to the axis 298) from the first passage 374 through the cutting bit 286 to nozzles 382 positioned along the perimeter of the cutting bit 286 between the cutting tips 386 (FIG. 14). The clearance fluid (e.g., water) is pumped through the first passage 374 and through the second passage 378 before being discharged through the nozzles 382. The fluid discharge path is aligned with the primary cutting direction.

The cutting clearance system eliminates hoses or other fluid conduit near the cutting interface. Furthermore, the cutting clearance system does not require additional moving parts inside the cutter head 222, since the first passage 374 is fixed and statically sealed to the cutting bit 286. In addition, embedding the nozzles 382 in the cutting bit 286 reduces the potential for damage to the fluid circuit or blockage caused by cuttings or debris.

Unlike conventional oscillating disc cutter systems that merely allow for adjusting the motion or speed of the disc cutter, the mining machine 10 monitors certain characteristics of the cutter head 22 and incorporates feedback from the cutting interface to adjust certain parameters. The mining machine 10 detects changes in conditions of the cutting operation (e.g., a change in rock hardness or density) and incorporates the sensed information into a feedback control loop to modify the operating parameters of the cutter head 22 and optimize cutting performance. Such operating parameters may include the depth of cut, the angle of attack of the cutting bit 86 relative to the mine wall, the eccentricity of the exciter member 94, the oscillation frequency of the exciter member 94. Other factors (such as the diameter of the cutting bit 86, the geometry of the cutting edge and cutting tips, and the cutting clearance) may be modified through manual adjustments.

The cutting effectiveness of the cutter head 22 at least partially depends on the velocity of the inertial member 90 in the direction of cutting at the moment the cutting bit 86 impacts the mine wall, and on the frequency of the impacts between the cutting bit 86 and the mine wall. The velocity and frequency are controlled to optimize the velocity and the frequency of the impact of the cutter head 22 with the mine wall. The velocity and frequency can be controlled through various parameters, such as the effective mass of the exciter member 94, operating frequency of the exciter member 94, the stiffness of the cutter head 22 coupling member, the feed force from the boom, etc.

Figure 9A:
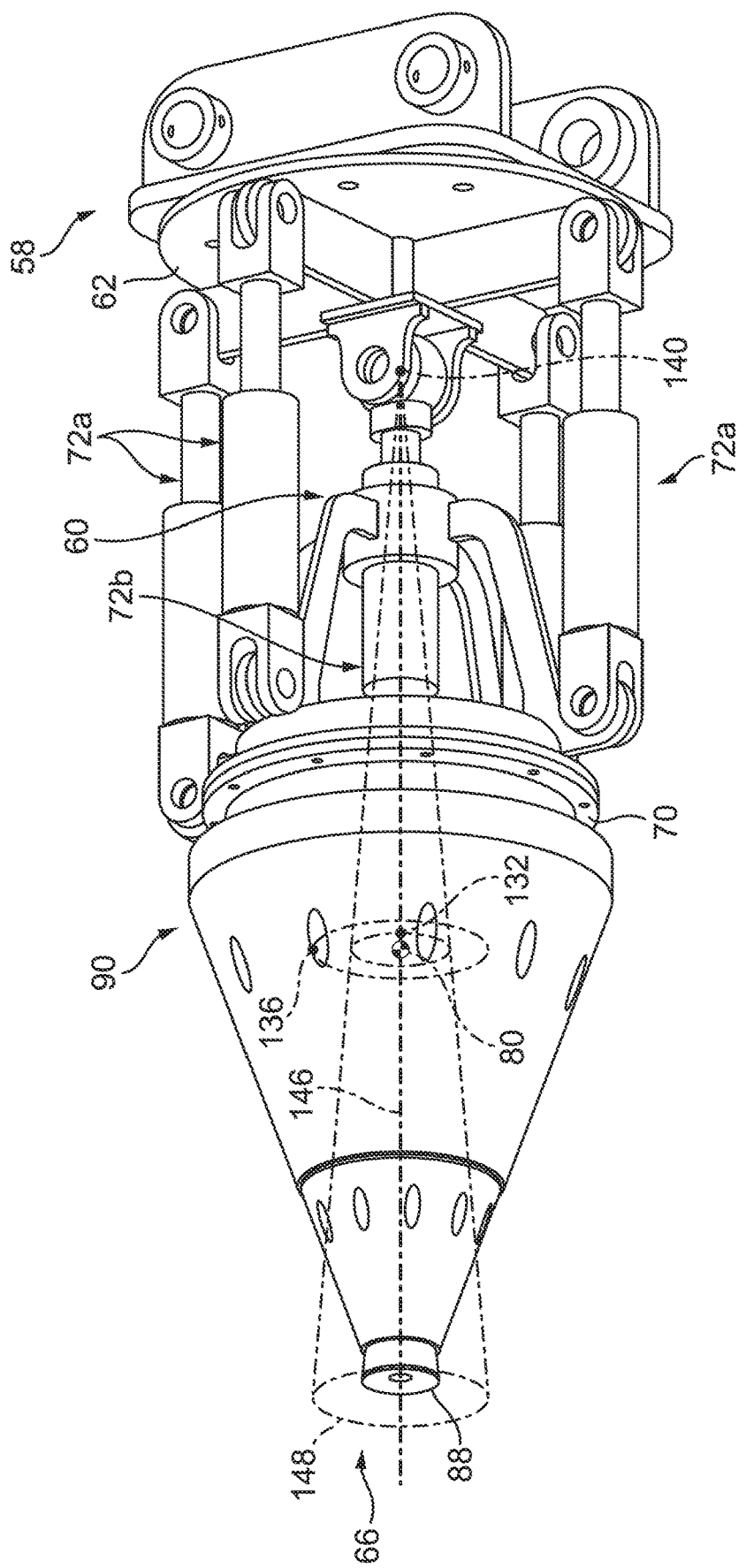
FIG. 9A is a side perspective view of the cutter head of FIG. 9.

Referring to FIG. 9A, as the cutter head 22 oscillates around the center of mass, the cutting bit 86 moves in a generally circular or elliptical motion to engage the mine wall. The control system synchronizes the oscillation of the inertial member 90 with the motion of the cutting bit 86 such that the cutting bit 86 engages the mine wall when the momentum of the inertial member 90 is directed substantially into the mine wall. This timing between the cutting bit's engagement in the wall and the motion of the inertial member 90 maximizes the velocity of the inertial member 90 in the direction of the wall, thereby maximizing the kinetic energy imparted to the wall by the cutter head 22. In other embodiments, the cutting bit 86 may trace a different shaped path, the bit 86 may engage the wall at a different position along the path 148, and/or the oscillation of the inertial member 90 may be synchronized to deliver maximum velocity at a different position along the path 148.

In one embodiment, the control system adjusts the force exerted by the boom 18 and varies the oscillation frequency of the exciter member 94 in order to increase or decrease cutting energy. These modifications optimize productivity by increasing cutting velocity when possible. In addition, the condition of the tool may be monitored to detect changes in productivity and feed force as the cutting bit becomes blunt.

In another embodiment, the cutter head 22 is controlled by directly sensing an indicator of the force exerted by the cutting bit 86 on the mine wall 26 in real-time. For example, the control system may include a load cell (e.g., a multi-axis strain gauge; not shown) positioned on the cutting bit 86 to detect the stress on the cutting bit. The cutting force is calculated based on the measured stress. In addition, the control system may include sensors, such as infrared sensors, for monitoring the temperature at the cutting interface. The load sensor and thermal sensor provide accurate measurements of the performance of the cutter head 22, permitting accurate adjustment of certain parameters (such as cutting speed or feed force) in order to optimize the closed loop control and optimize the power provided at the cutting interface. In another embodiment, the control system includes measuring a cutting speed of the cutting bit 86 with non-contact sensors and varying a feed rate of the cutter head 22 to optimize a cutting rate. Other embodiments can incorporate other adaptive features to optimize performance of the cutter head 22.

In general, increasing the power delivered by a cutter head 22 to the mine wall 26 generally results in a larger amount of rock cut from the wall 26. The power delivered by the cutter head 22 varies depending on the rotation speed of the cutting bit 86, the eccentricity of the cutting bit 86, the mass of the inertial member 90 and the exciter member 94, and the cutting feed force. In one embodiment, one or more of these parameters remain fixed due to the inherent characteristics of the mining machine 10 and the remaining parameters are dynamically controlled to continuously monitor and optimize the power output of the cutter head 22. For example, a selected parameter may be varied slightly and the system detects whether the variation increases the cutting rate. If so, the selected parameter is adjusted further in the same direction. Otherwise, the parameter is adjusted in the opposite direction and any change in the cutting rate is monitored. The process is frequently repeated to ensure that the machine is generating maximum power output.

In another embodiment, the control system provides automated position and force control of the boom 18. The cutter head consistently operates at maximum capacity and at an optimum setting. In addition, the magnitude and direction of a load on the machine is known and controlled. The cutting force is the same for different applications, conditions, rock types etc., but the production rate varies depending on these parameters. Because the system is optimally tuned for substantially all conditions, it is not necessary to change the parameters if the mine conditions change (e.g., if the rock density changes). The cutting operation can be slowed down if required by reducing the oscillation speed of the cutting bit 86 and/or the exciter mass 94.

In other embodiments, the mining machine includes multiple cutter heads 22 coupled to a common boom 18. Each cutter head 22 is force-controlled as described above, while the common boom 18 is position-controlled. Each cutter head 22 constitutes a single cutter system with the position-controlled common boom 18 as described above; however, each cutter system is linked via the common boom 18. The multiple cutter system is controlled to progress through the mine wall 26 at a rate that is determined by the least productive individual cutter head 22 (i.e., the master cutter head). The more productive cutter head systems (i.e., slave cutter heads) are de-tuned to match the rate of the master cutter head in order to prevent the more productive systems from overrunning the position-controlled boom 18. In one embodiment, the slave cutter(s) are de-tuned by altering one of the operating parameters, (e.g., the rotation speed of the cutting bit). For example, a master cutter head operates at nominal speed, while the slave cutter heads operate at speeds slower than the rated value. If a slave cutter head begins to lag, its speed is increased until its cutting performance matches the master cutter. The parameter(s) of the master cutter head are continuously varied to maximize its power output as described above with respect to the single cutter head system.

If the speed of one of the slave cutter heads is adjusted to exceed the nominal cutting speed due to, for example, a change in cutting conditions, the slave cutter is automatically designated the master cutter head and the previous master cutter head becomes a slave. Therefore, the poorest performing cutter head is continuously adjusted to achieve its maximum possible performance and the other cutter heads are controlled to match this performance, thereby achieving maximum performance of the combined cutter head assembly. In one embodiment, a significant discrepancy in the relative performance of the cutter heads indicates either differing rock characteristics or cutter condition problems.

Thus, the invention provides, among other things, a cutter head for a mining machine. Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A method for controlling a mining machine, the method comprising:
   sensing a value of an indicator of a cutting efficiency of a cutter head;

comparing the sensed value of the indicator with a desired value of the indicator;
modifying an operating parameter in a first direction from an initial value to a second value, including modifying an operating parameter of an eccentric mass supported on the cutter head, movement of the eccentric mass inducing oscillation of the cutter head;
detecting the change relative to the sensed value of the indicator of cutting efficiency; and
when the change in the indicator of the cutting efficiency represents an improvement, modifying the operating parameter further in the first direction to a third value.

2. The method of claim 1, wherein the indicator is a strain exerted on a cutting bit engaging a rock wall.

3. The method of claim 1, wherein the indicator is a cutting energy transferred from the cutter head to a rock wall.

4. The method of claim 1, wherein the operating parameter is an oscillation frequency of the eccentric mass positioned within the cutter head.

5. The method of claim 1, wherein the operating parameter is an oscillation amplitude of the eccentric mass positioned within the cutter head.

6. The method of claim 1, wherein the sensed value includes an angular position of a cutting bit against a rock wall and the angular direction of the momentum of an inertial mass relative to the angular position of the cutting bit, and wherein modifying the operating parameter includes modifying an oscillation of the inertial mass to change the direction of the momentum of the inertial mass when the cutting bit engages the rock wall.

7. The method of claim 6, wherein the sensed value includes a cutting feed rate of the cutter head.

8. The method of claim 6, further including, if the indicator of cutting efficiency degrades, modifying the operating parameter to its initial value.

9. The method of claim 1, wherein the operating parameter includes a parameter of the movement of the eccentric mass.

10. The method of claim 1, wherein the operating parameter includes at least one of an oscillating frequency of the eccentric mass and an oscillation amplitude of the eccentric mass.

11. A method for controlling a mining machine, the method comprising:
sensing a first value of an indicator of a cutting efficiency of a first cutter;
sensing a second value of an indicator of cutting efficiency of a second cutter;
comparing the first value with the second value to detect whether the first value is less than the second value;
when the first value is less than the second value, modifying an operating parameter of the second cutter so that the second value matches the first value.

12. The method of claim 11, further including maintaining the operating parameter of the second cutter so that the second value does not exceed the first value.

13. The method of claim 11, wherein the indicator of cutting efficiency of the second cutter is a strain exerted on a cutting bit of the second cutter engaging a rock wall.

14. The method of claim 11, wherein the indicator of cutting efficiency of the second cutter is a cutting energy transferred from the second cutter to a rock wall.

15. The method of claim 11, wherein the operating parameter is an oscillation frequency of an eccentric mass of the second cutter.

16. The method of claim 11, wherein the operating parameter is an oscillation amplitude of an eccentric mass of the second cutter.

17. The method of claim 11, wherein the second value includes an angular position of a cutting bit of the second cutter against a rock wall and the angular direction of the momentum of an inertial mass of the second cutter relative to the angular position of the cutting bit of the second cutter, and wherein modifying the operating parameter includes modifying an oscillation of the inertial mass to change the direction of the momentum of the inertial mass when the cutting bit of the second cutter engages the rock wall.

18. The method of claim 17, wherein the second value of an indicator of cutting efficiency of the second cutter includes a cutting feed rate of the second cutter.

19. A method for controlling a mining machine, the method comprising:
sensing a value of an indicator of a cutting efficiency of a cutter head;
comparing the sensed value of the indicator with a desired value of the indicator;
modifying an operating parameter in a first direction from an initial value to a second value;
detecting the change relative to the sensed value of the indicator of cutting efficiency; and
when the change in the indicator of the cutting efficiency represents an improvement, modifying the operating parameter further in the first direction to a third value,
wherein the sensed value includes an angular position of a cutting bit against a rock wall and the angular direction of the momentum of an inertial mass relative to the angular position of the cutting bit, and wherein modifying the operating parameter includes modifying an oscillation of the inertial mass to change the direction of the momentum of the inertial mass when the cutting bit engages the rock wall.

20. The method of claim 19, wherein the indicator is a strain exerted on a cutting bit engaging a rock wall.

21. The method of claim 19, wherein the indicator is a cutting energy transferred from the cutter head to a rock wall.

22. The method of claim 19, wherein the operating parameter is an oscillation frequency of an eccentric mass positioned within the cutter head.

23. The method of claim 19, wherein the operating parameter is an oscillation amplitude of an eccentric mass positioned within the cutter head.

24. The method of claim 19, wherein the sensed value includes a cutting feed rate of the cutter head.

25. The method of claim 19, further including, if the indicator of cutting efficiency degrades, modifying the operating parameter to its initial value.

26. A method for controlling a mining machine, the method comprising:
sensing a value of an indicator of a cutting efficiency of a cutter head;
comparing the sensed value of the indicator with a desired value of the indicator;
modifying an operating parameter in a first direction from an initial value to a second value;
detecting the change relative to the sensed value of the indicator of cutting efficiency; and
when the change in the indicator of the cutting efficiency represents an improvement, modifying the operating parameter further in the first direction to a third value,
wherein the indicator is a cutting energy transferred from the cutter head to a rock wall.

27. The method of claim 26, wherein the operating parameter is an oscillation frequency of an eccentric mass positioned within the cutter head.

28. The method of claim 26, wherein the operating parameter is an oscillation amplitude of an eccentric mass positioned within the cutter head.

29. The method of claim 26, wherein modifying an operating parameter includes modifying an operating parameter of an eccentric mass supported on the cutter head, movement of the eccentric mass inducing oscillation of the cutter head, the operating parameter including a parameter of the movement of the eccentric mass.

30. The method of claim 26, wherein modifying an operating parameter includes modifying an operating parameter of an eccentric mass supported on the cutter head, movement of the eccentric mass inducing oscillation of the cutter head, the operating parameter includes at least one of an oscillating frequency of the eccentric mass and an oscillation amplitude of the eccentric mass.

\* \* \* \* \*